Jan. 1, 1963 K. C. ALLEN 3,071,318
WEIGHING SCALES

Filed Aug. 5, 1960 36 Sheets-Sheet 1

INVENTOR.
KENNETH C. ALLEN
BY
*Marechal, Biebel, French & Bugg*
ATTORNEYS

Jan. 1, 1963   K. C. ALLEN   3,071,318
WEIGHING SCALES
Filed Aug. 5, 1960   36 Sheets-Sheet 2

FIG-3

Jan. 1, 1963 K. C. ALLEN 3,071,318
WEIGHING SCALES
Filed Aug. 5, 1960 36 Sheets-Sheet 3

INVENTOR.
KENNETH C. ALLEN
BY
*Marechal, Biebel, French & Bugg*
ATTORNEYS

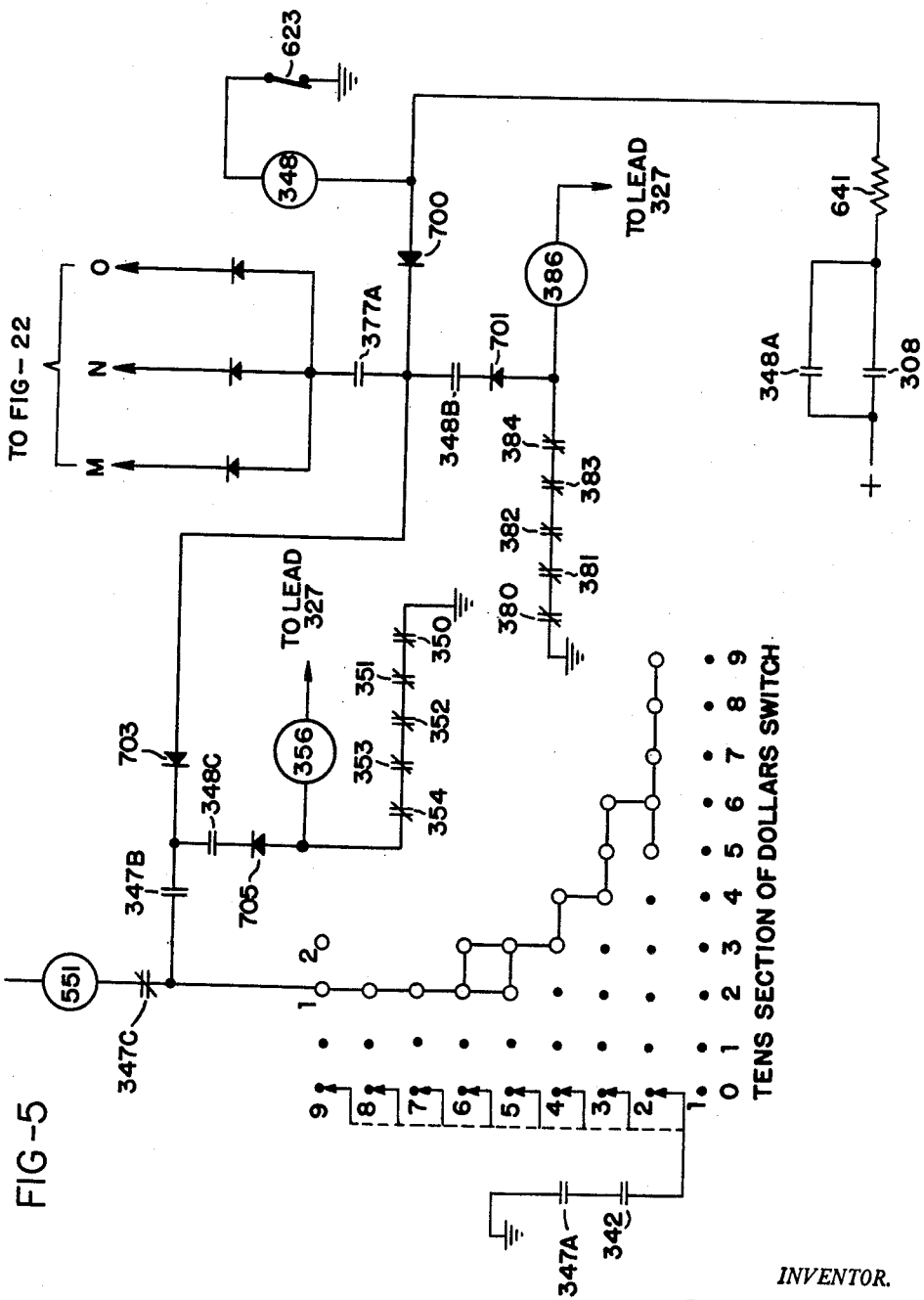

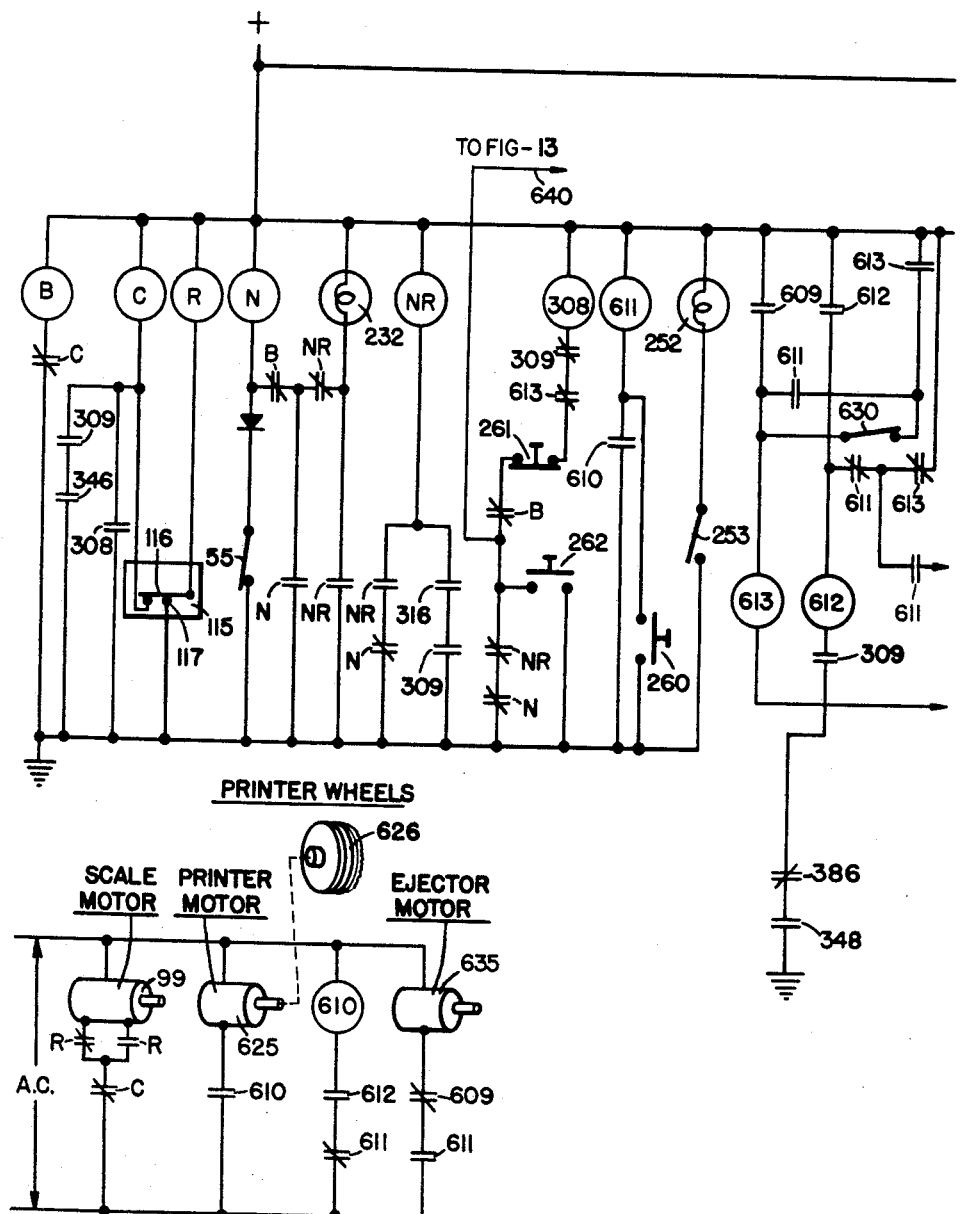

Jan. 1, 1963  K. C. ALLEN  3,071,318
WEIGHING SCALES

Filed Aug. 5, 1960

INVENTOR.
KENNETH C. ALLEN
BY
ATTORNEYS

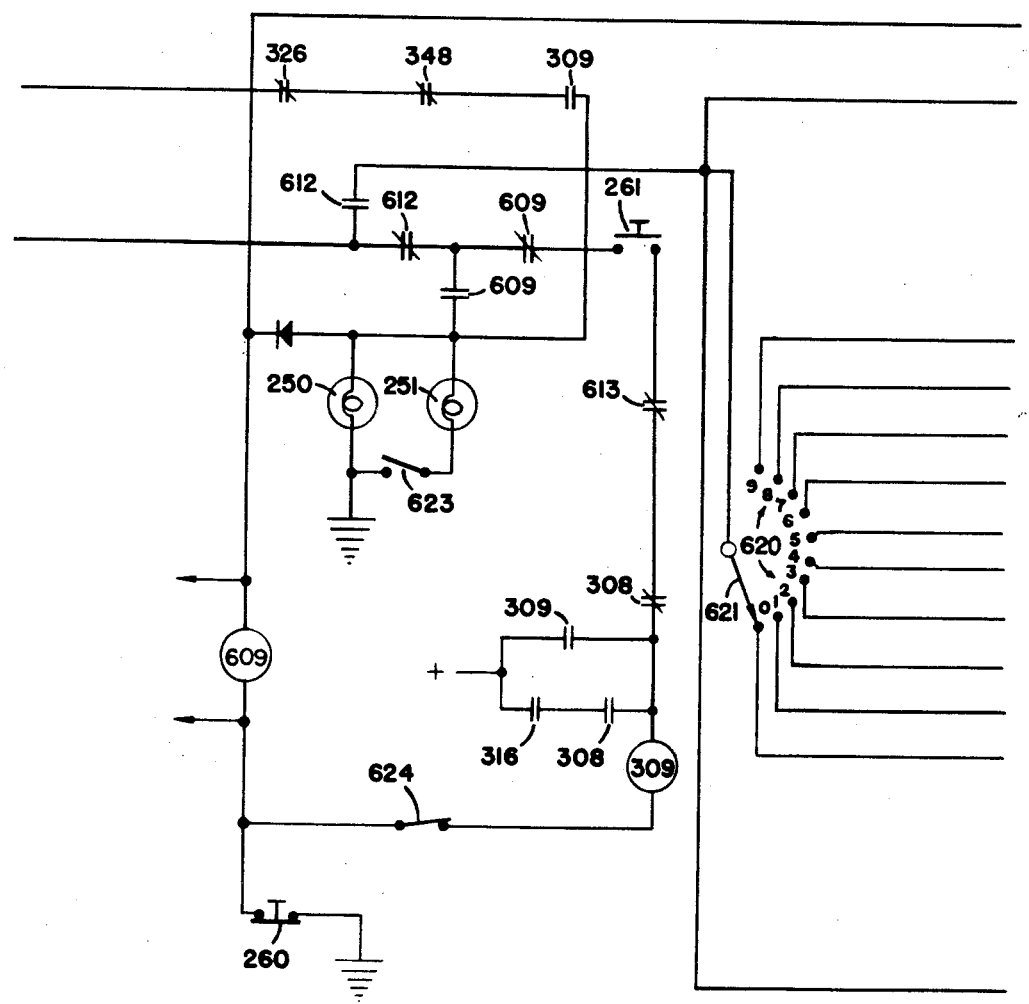

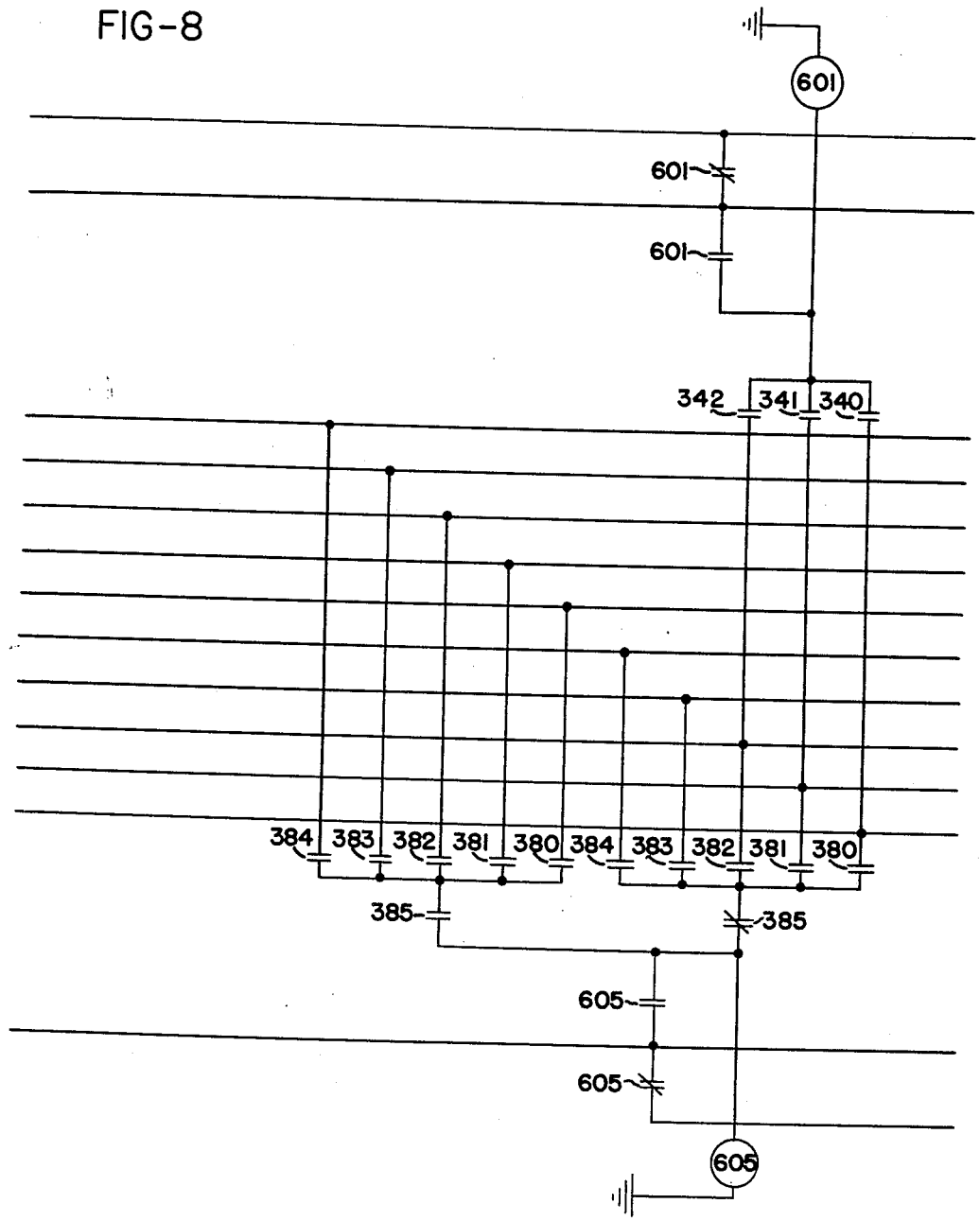

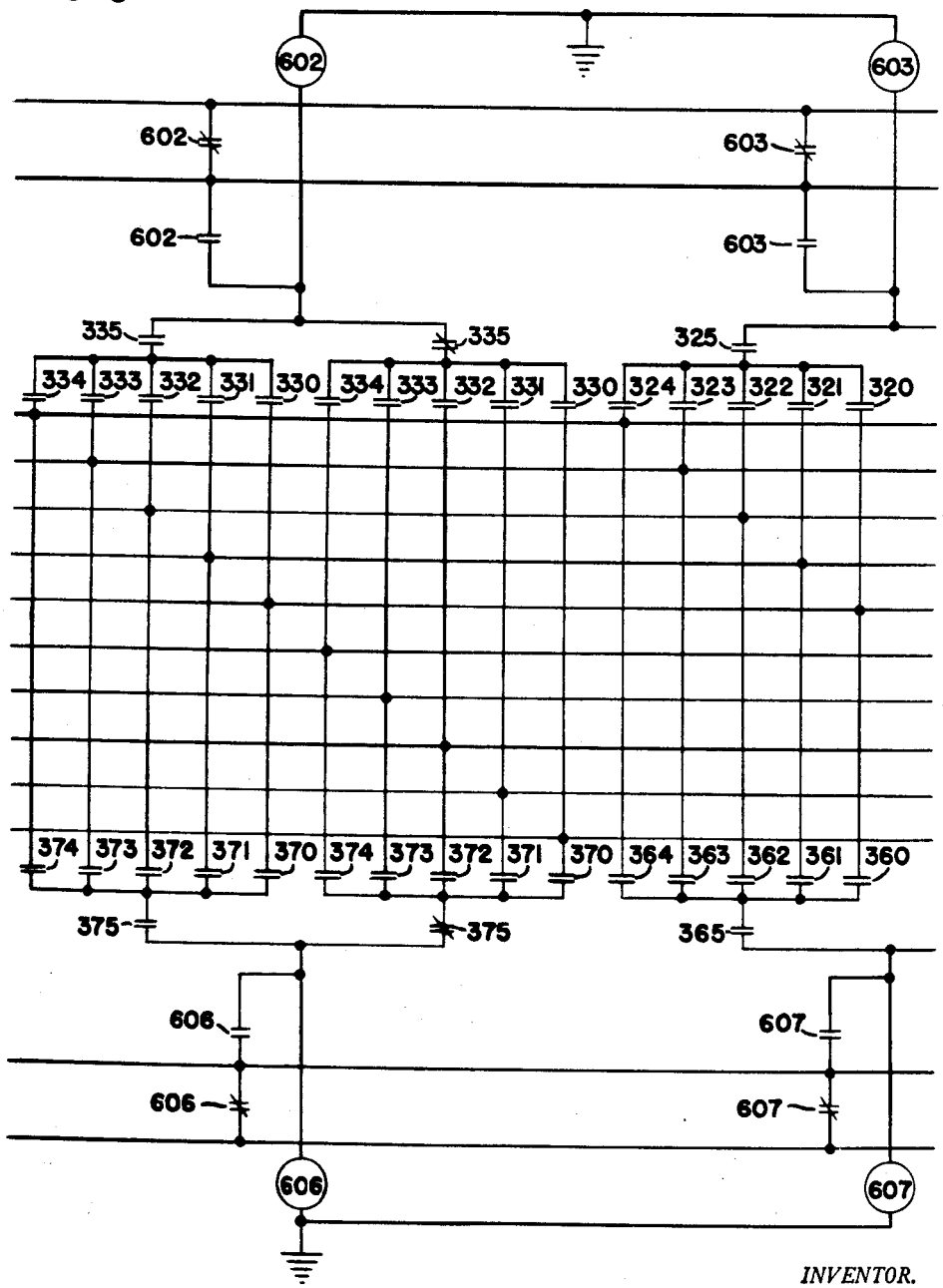

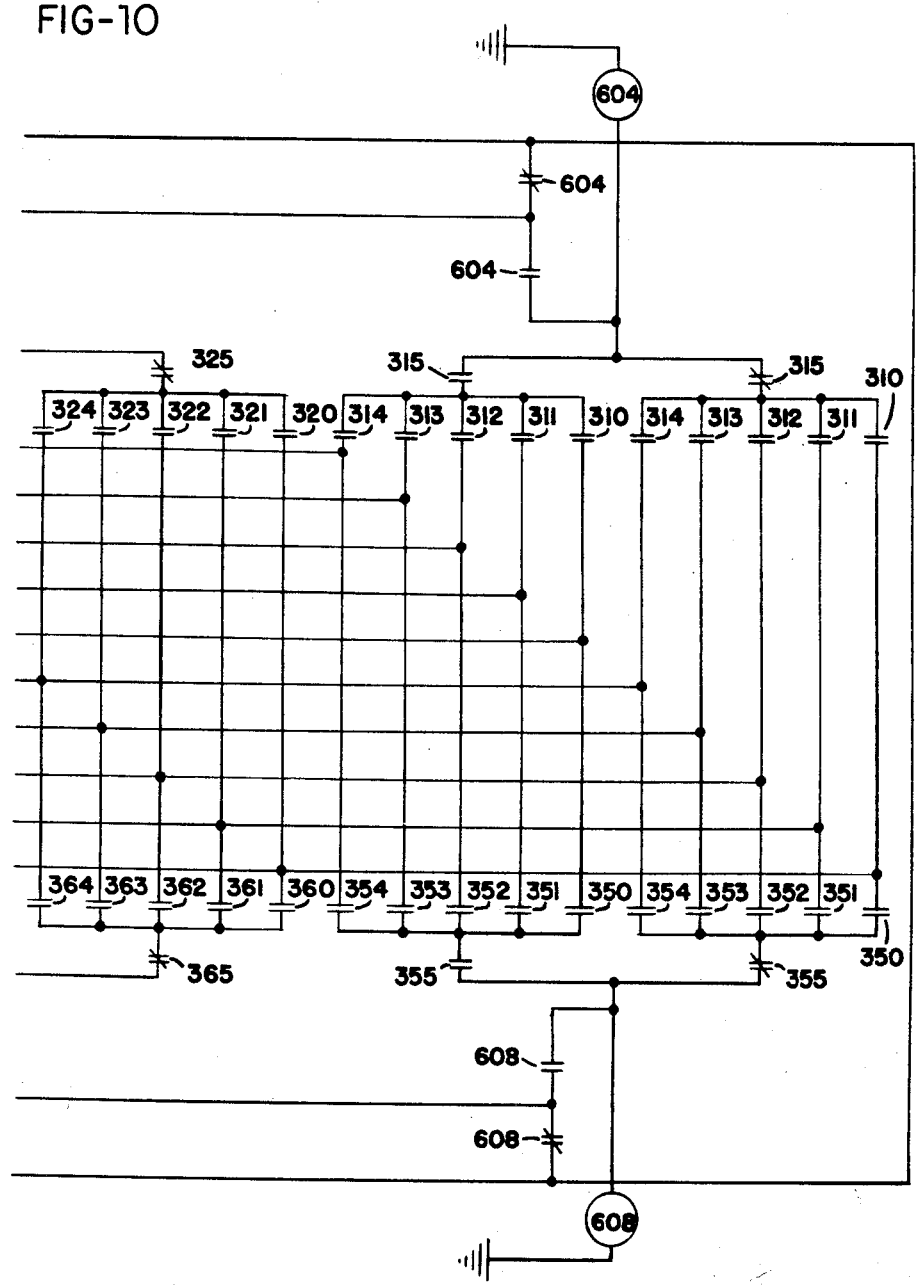

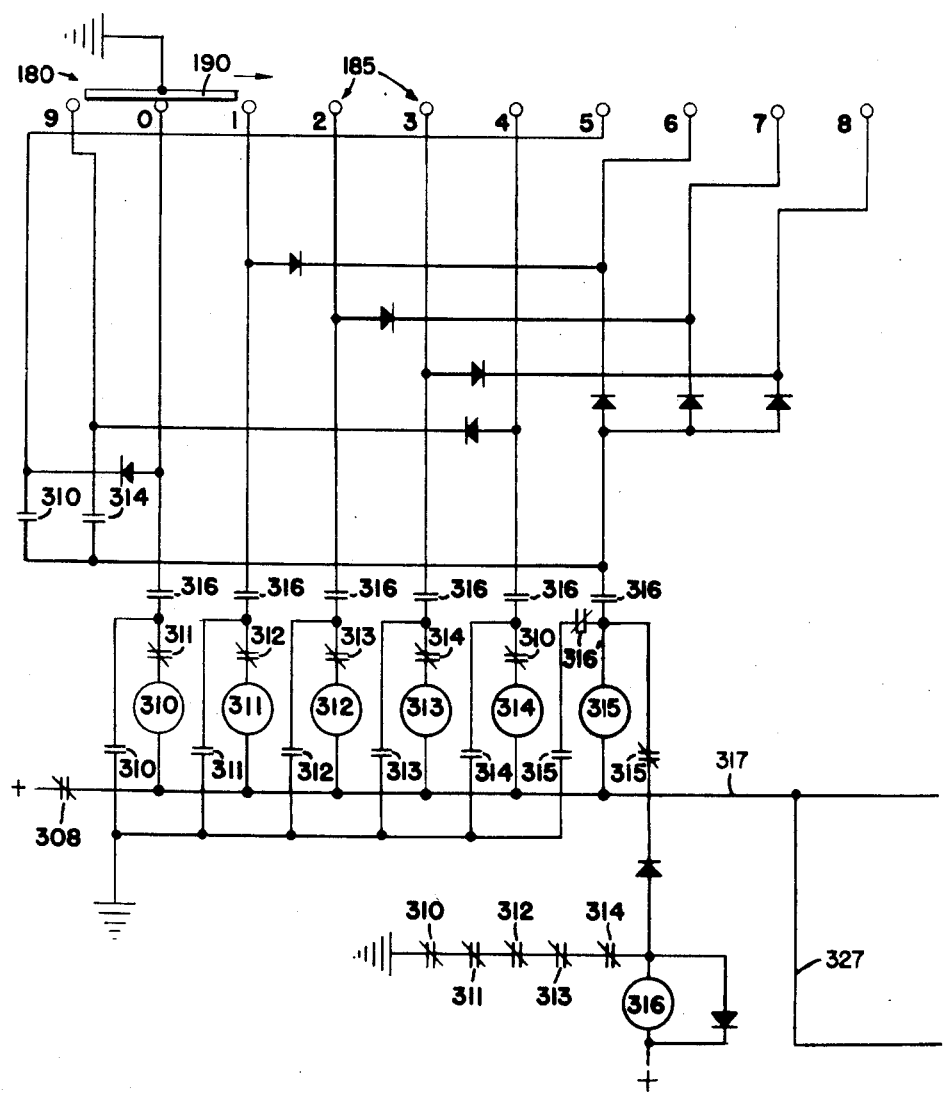

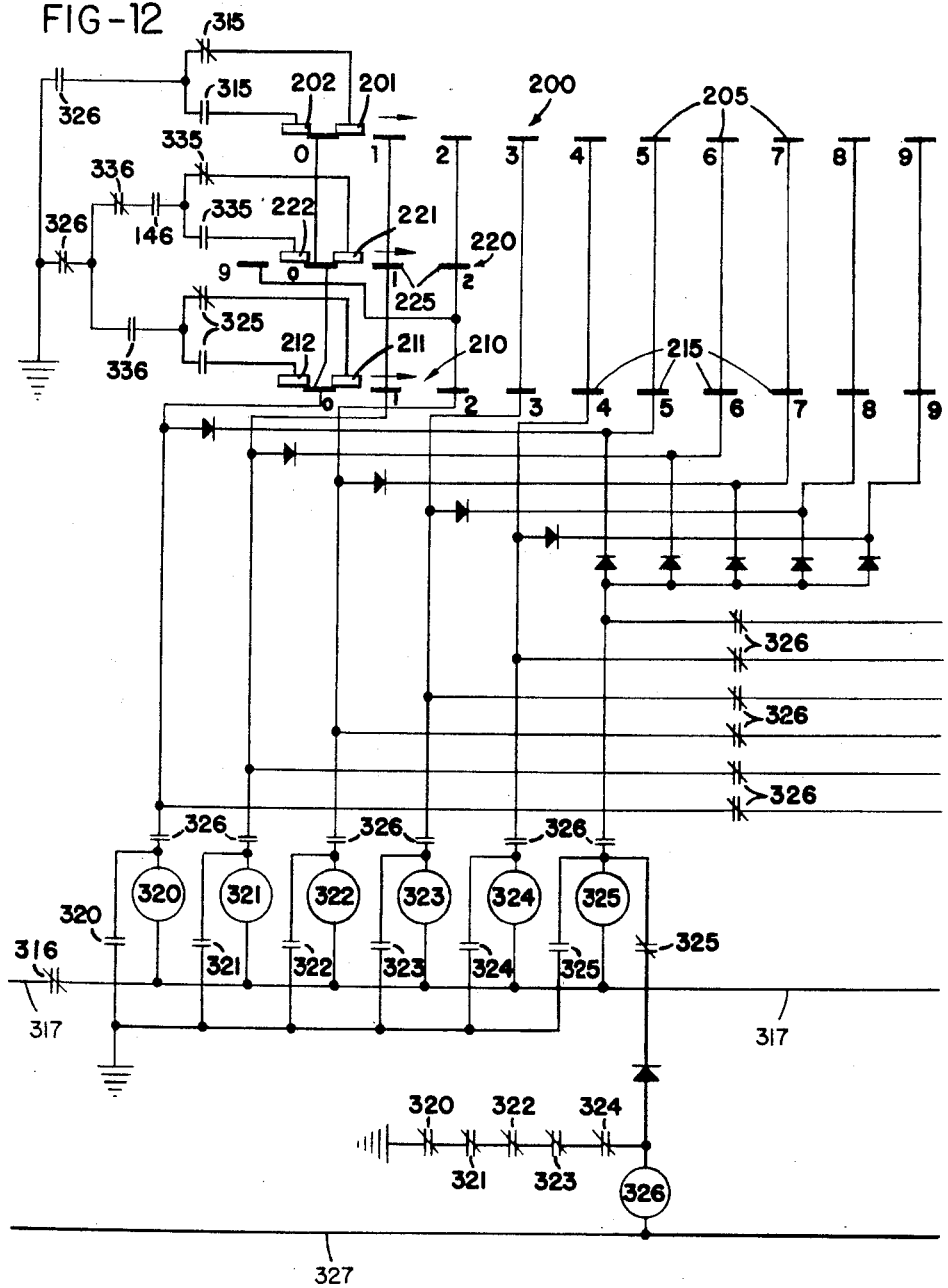

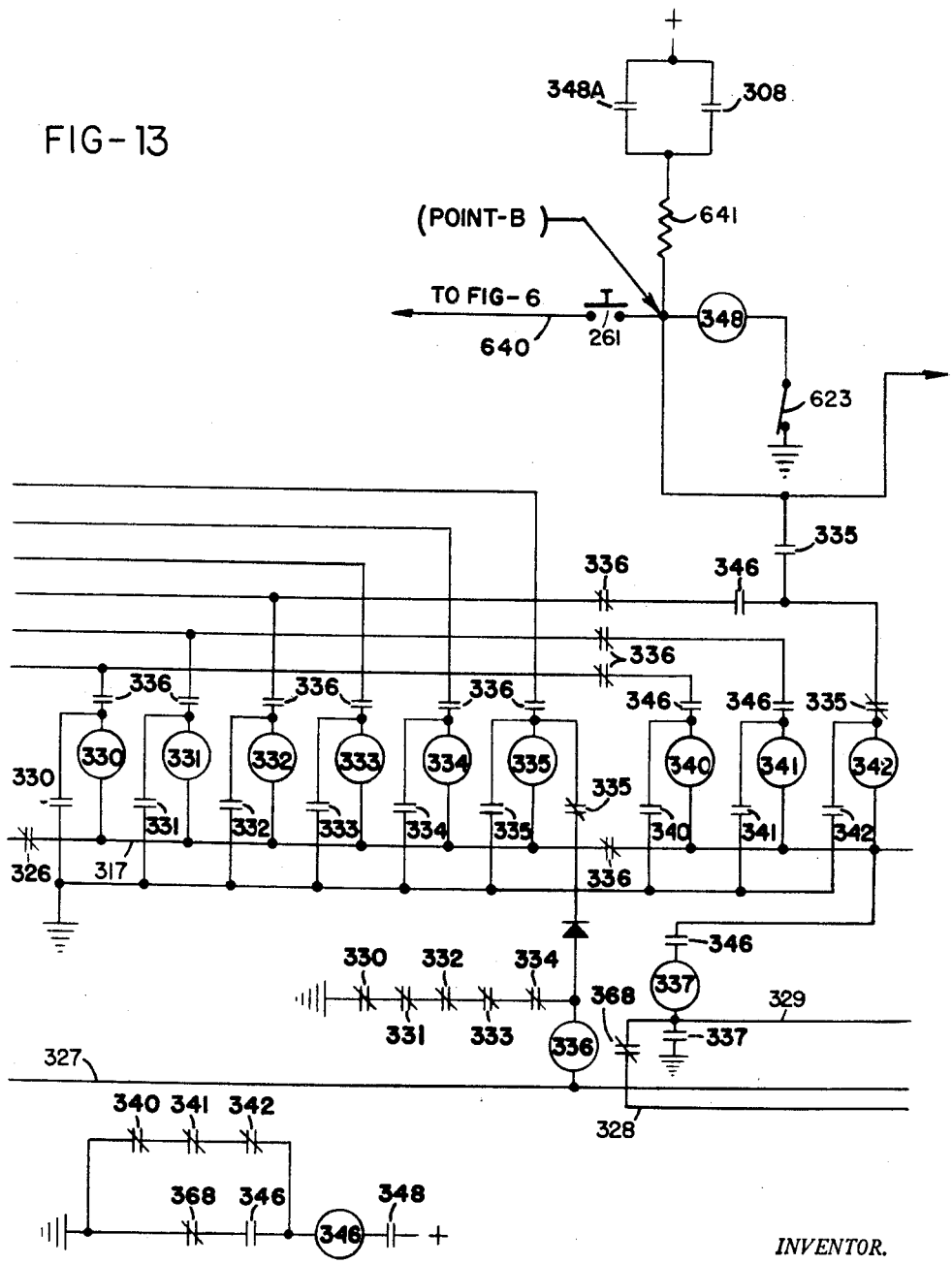

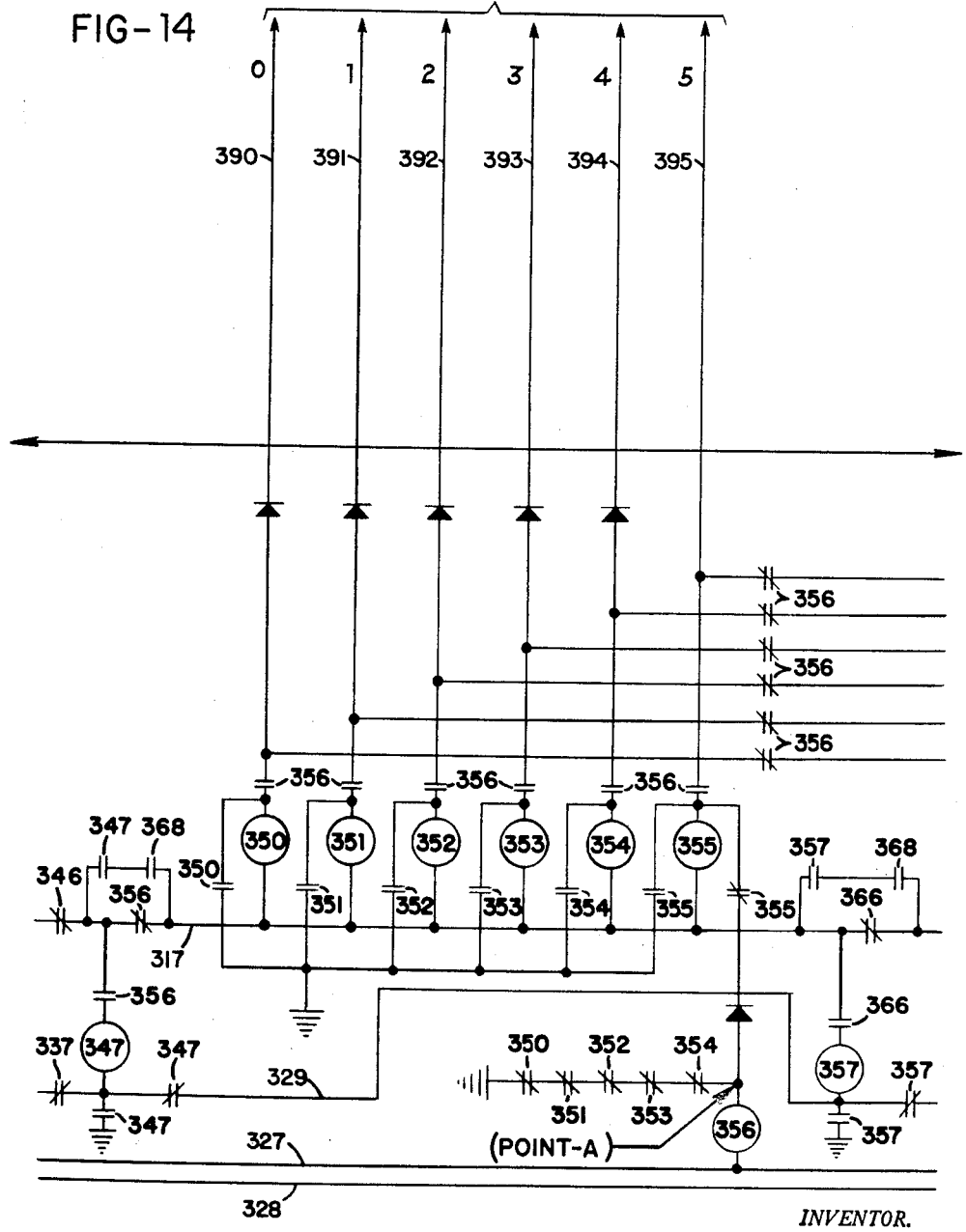

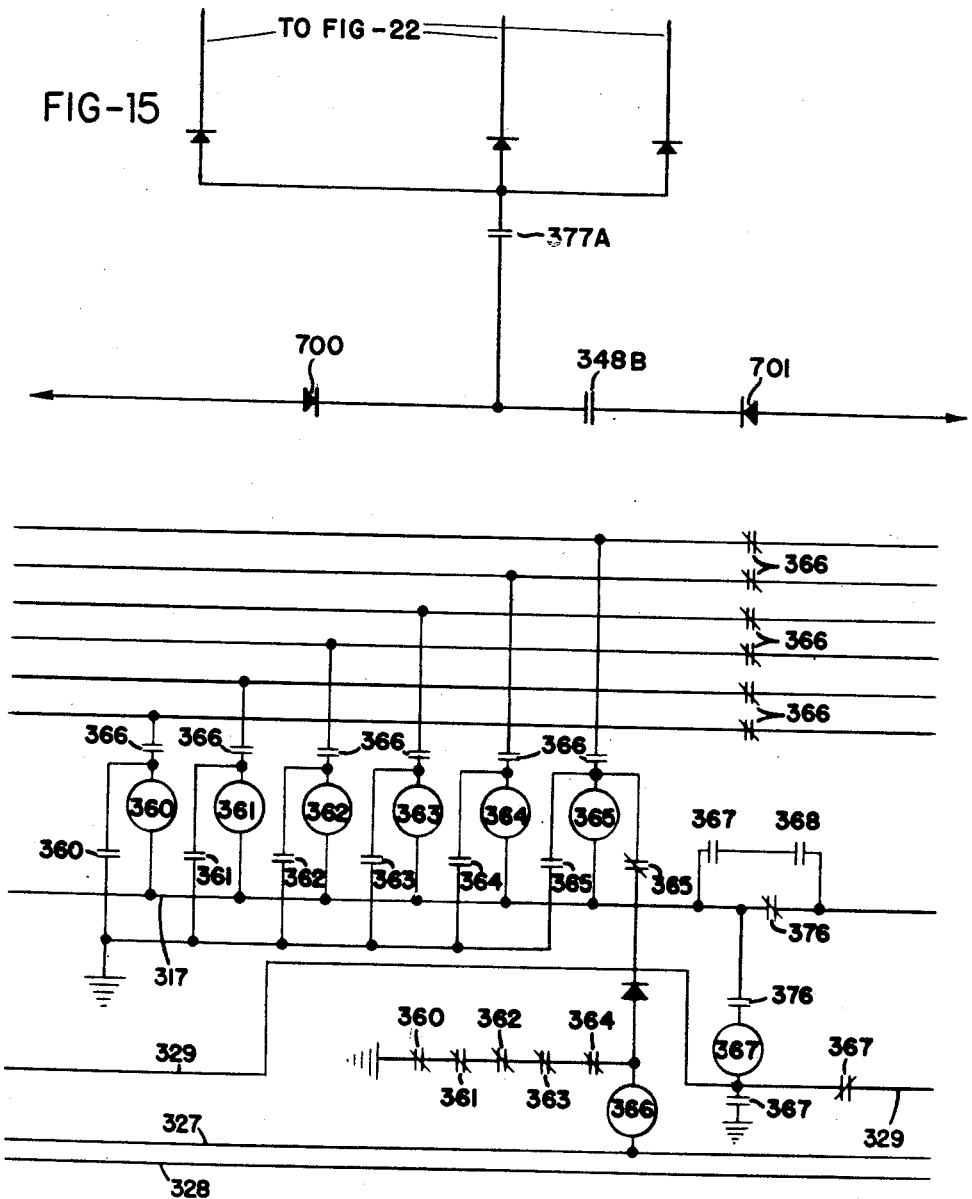

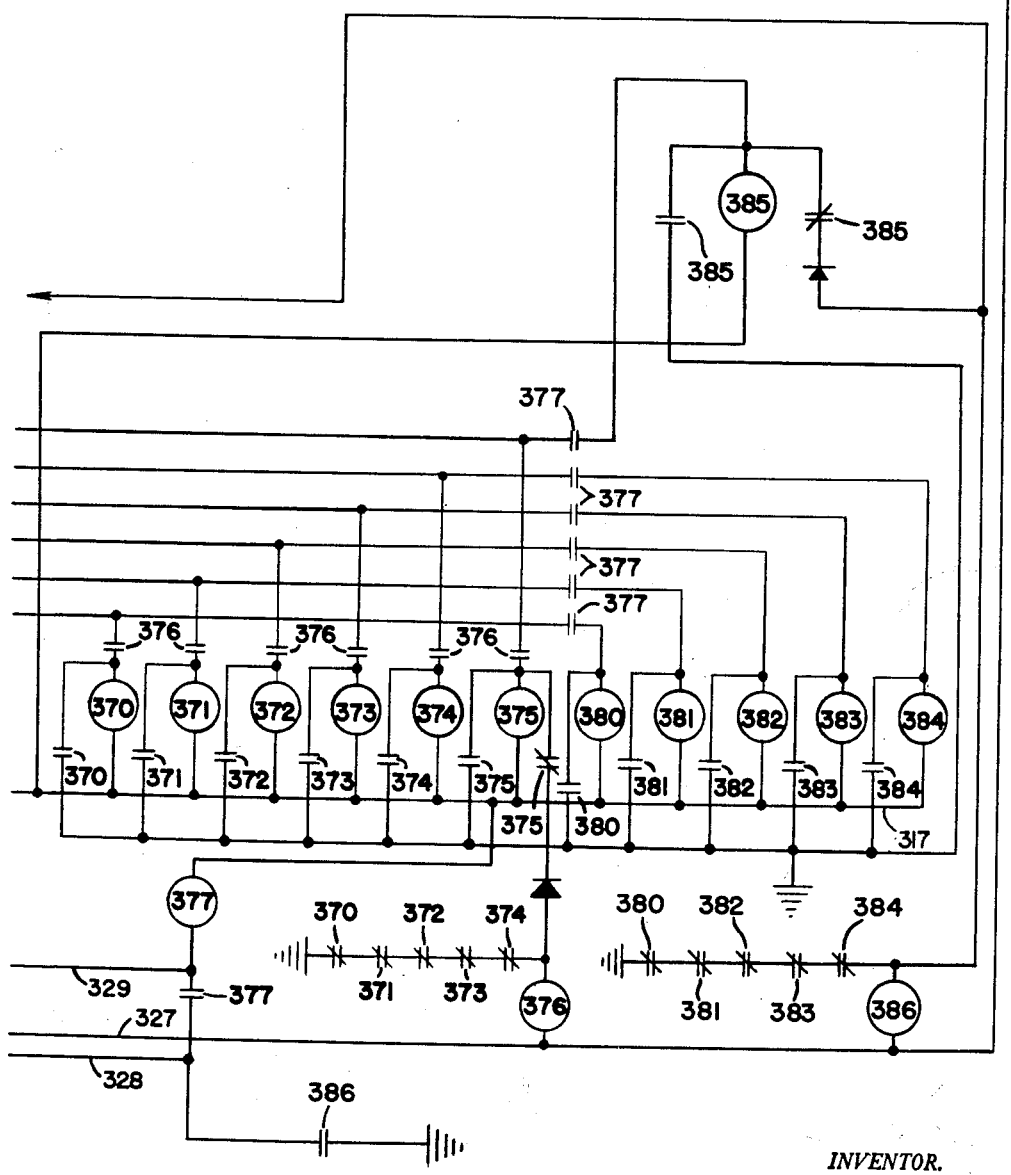

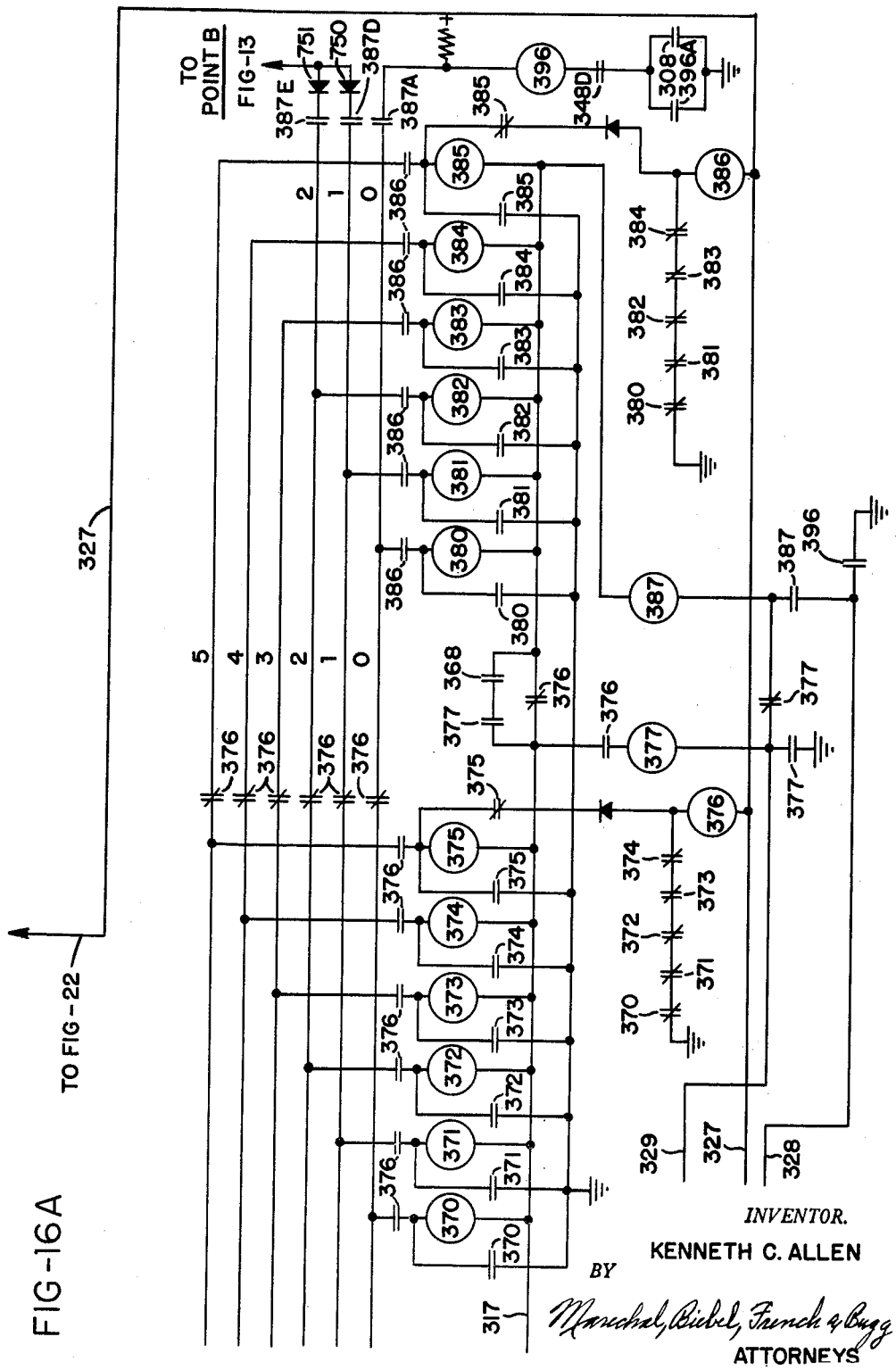

Jan. 1, 1963    K. C. ALLEN    3,071,318
WEIGHING SCALES
Filed Aug. 5, 1960    36 Sheets-Sheet 18

FIG-16B

INVENTOR.
KENNETH C. ALLEN
BY
Marechal, Biebel, French & Bugg
ATTORNEYS

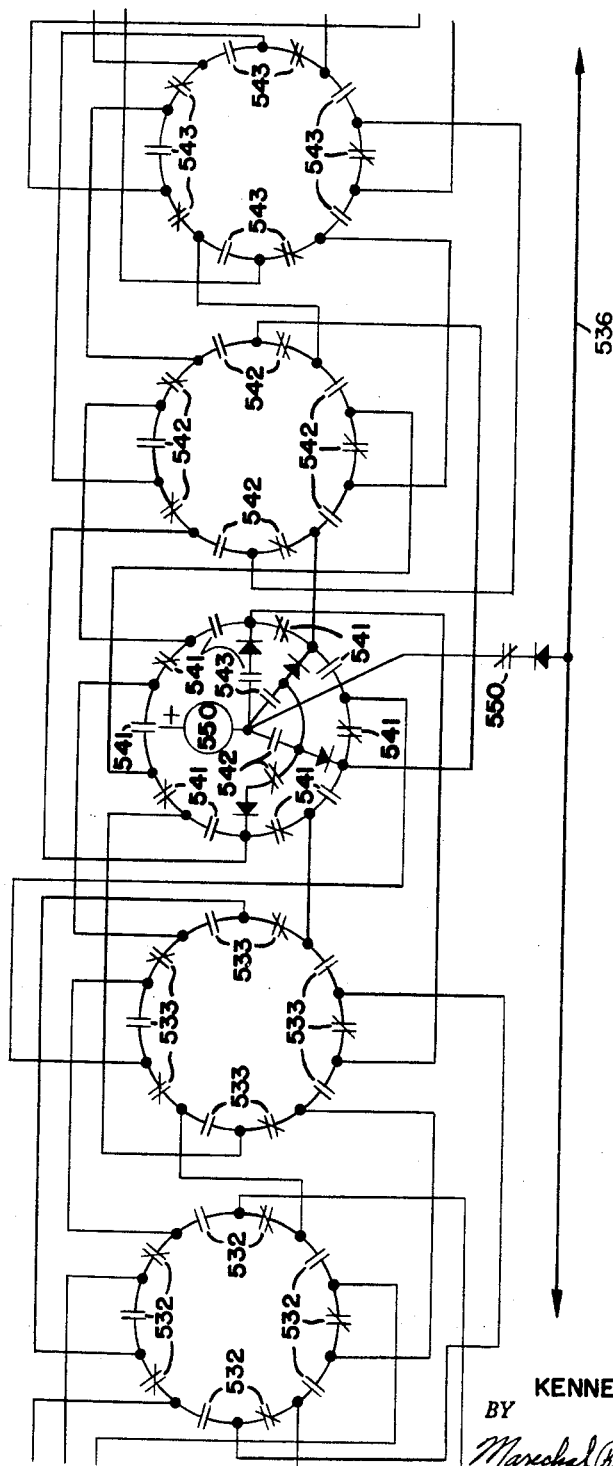

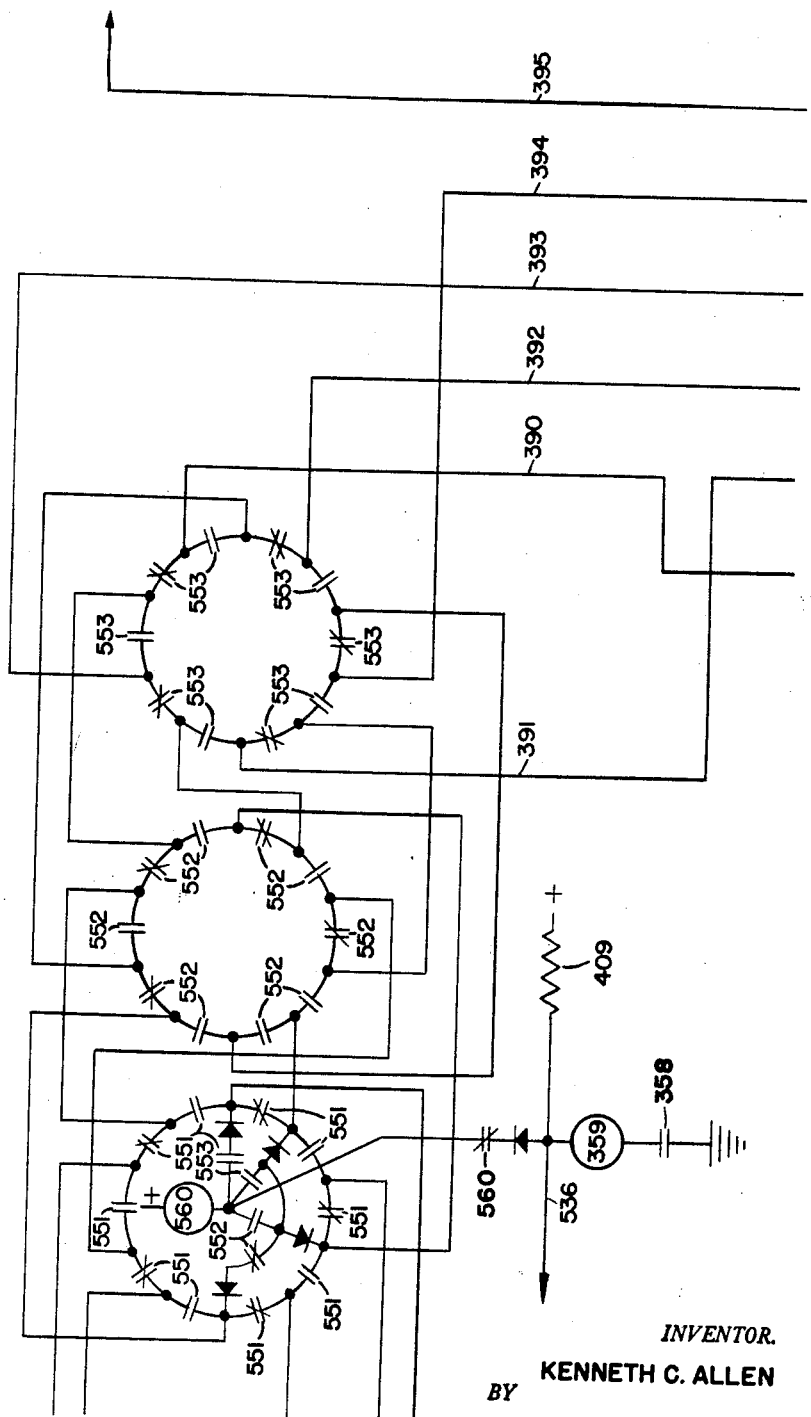

Jan. 1, 1963

K. C. ALLEN 3,071,318

WEIGHING SCALES

Filed Aug. 5, 1960

INVENTOR.
KENNETH C. ALLEN
BY
Marechal, Biebel, French & Bugg
ATTORNEYS

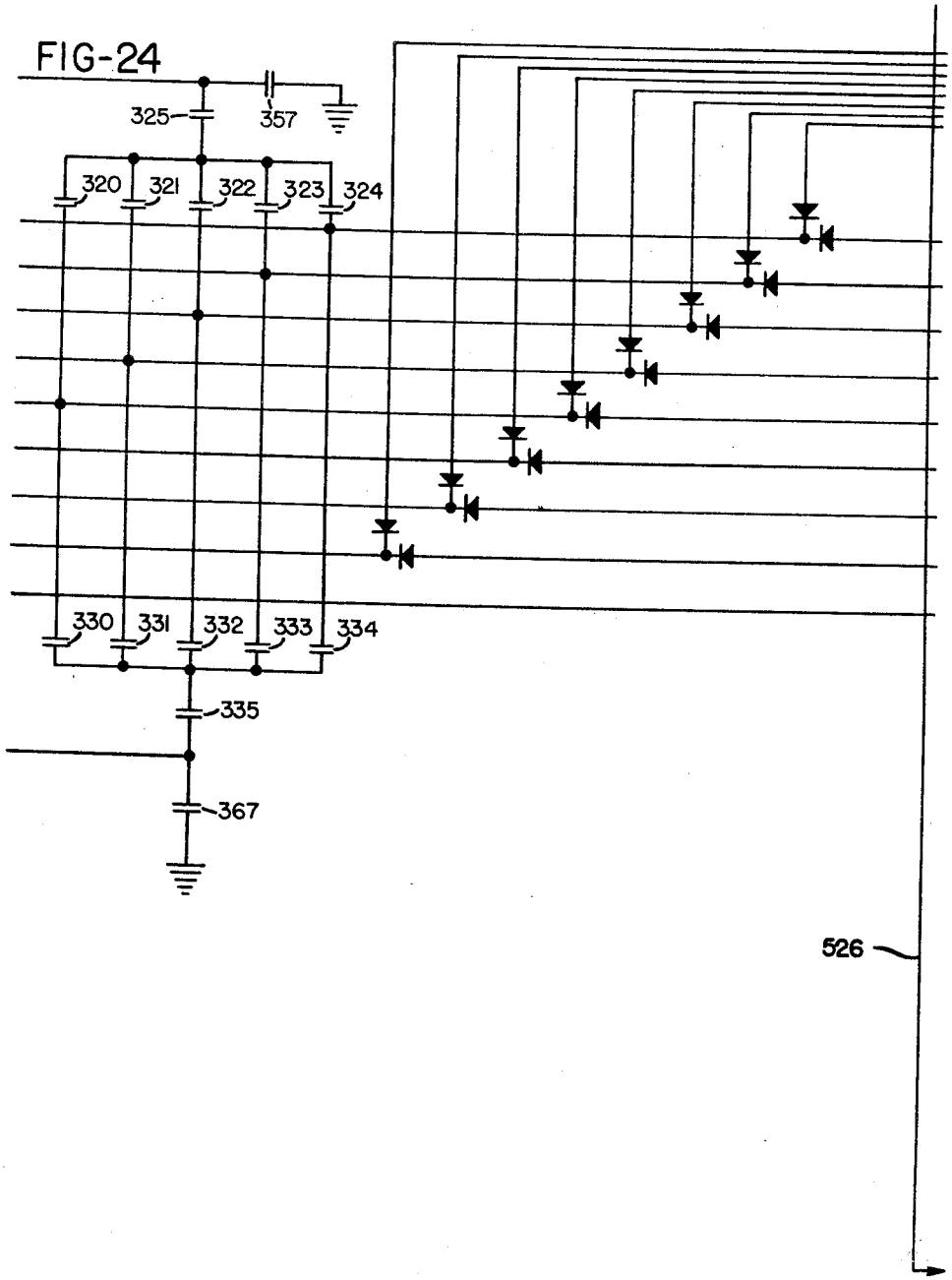

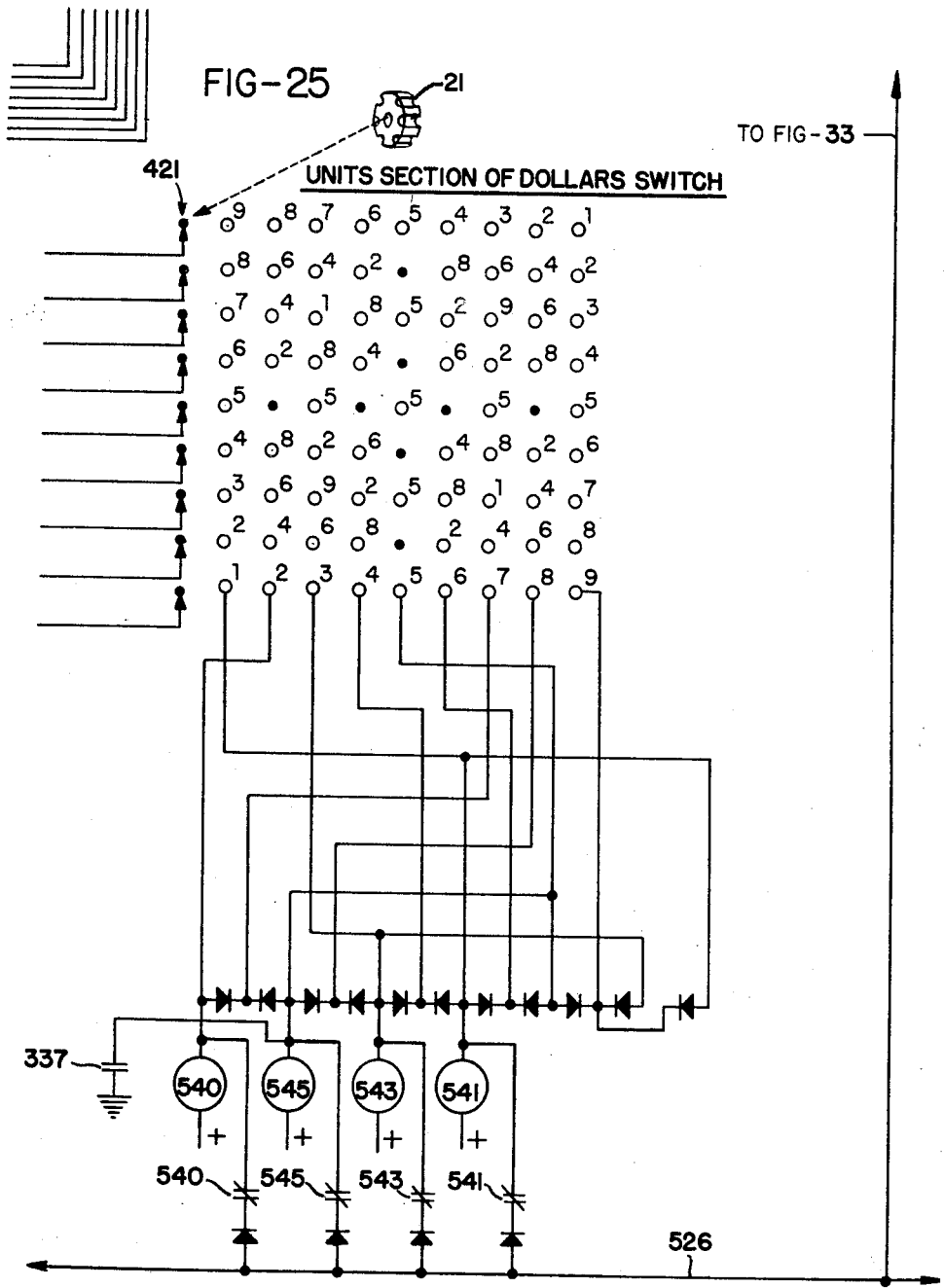

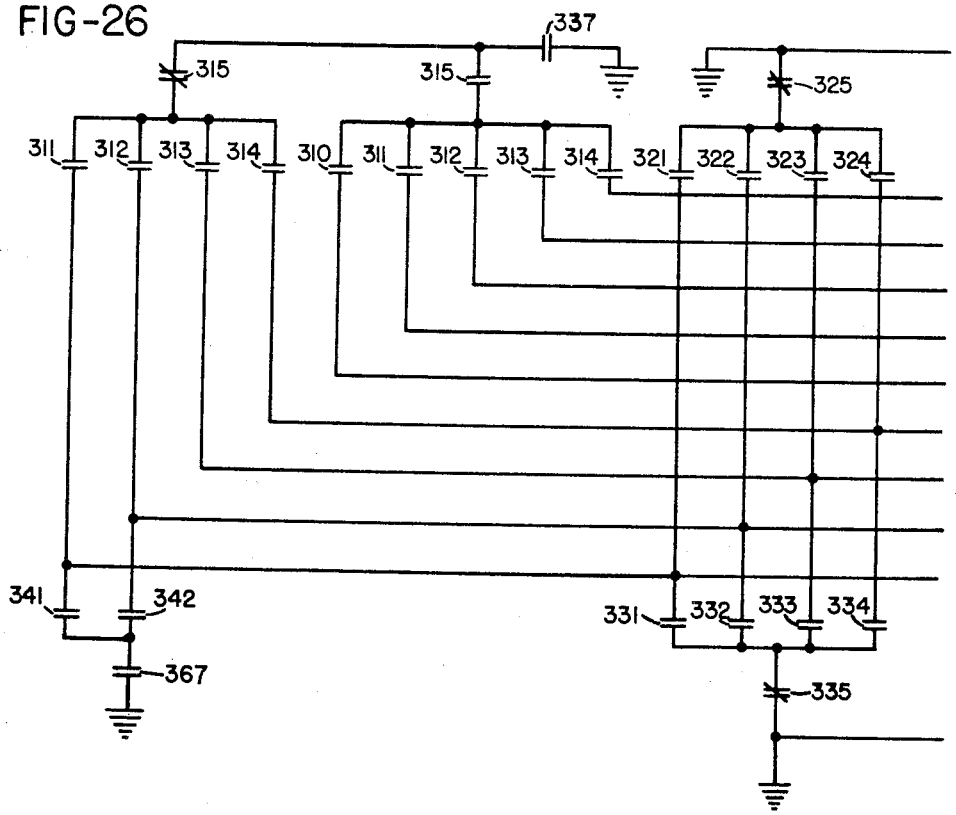

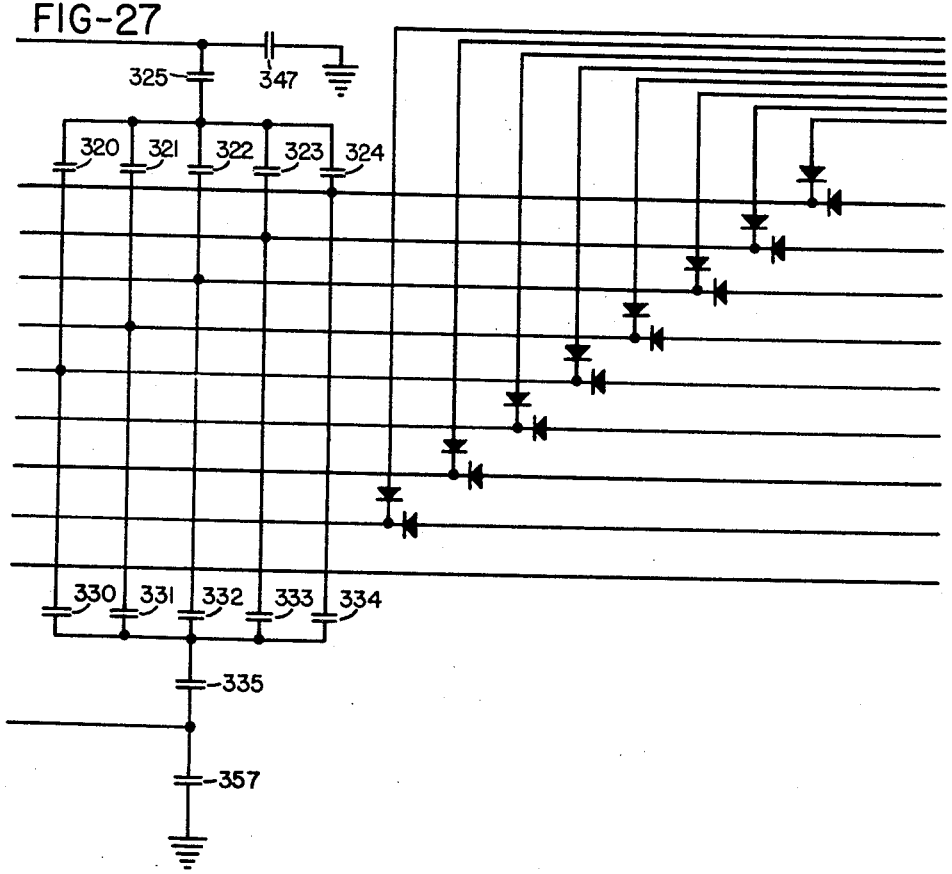

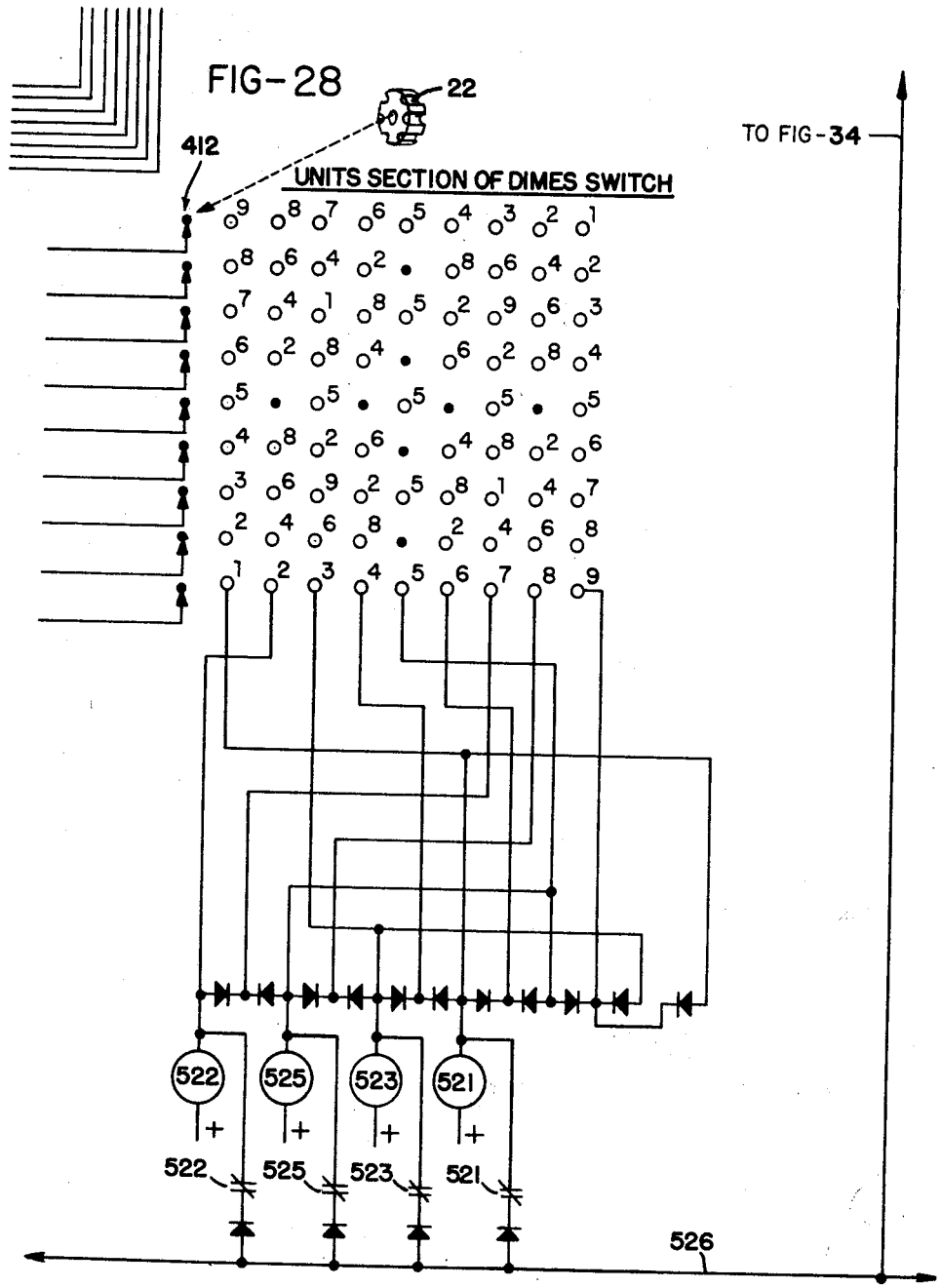

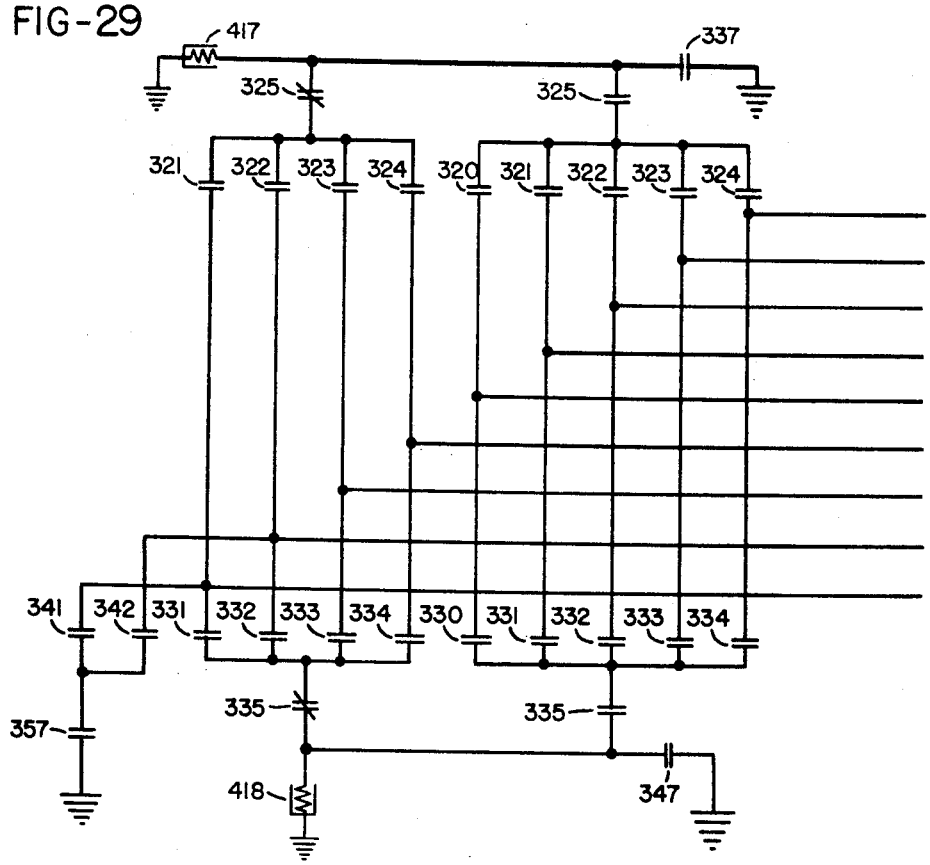

Jan. 1, 1963   K. C. ALLEN   3,071,318
WEIGHING SCALES
Filed Aug. 5, 1960   36 Sheets-Sheet 32
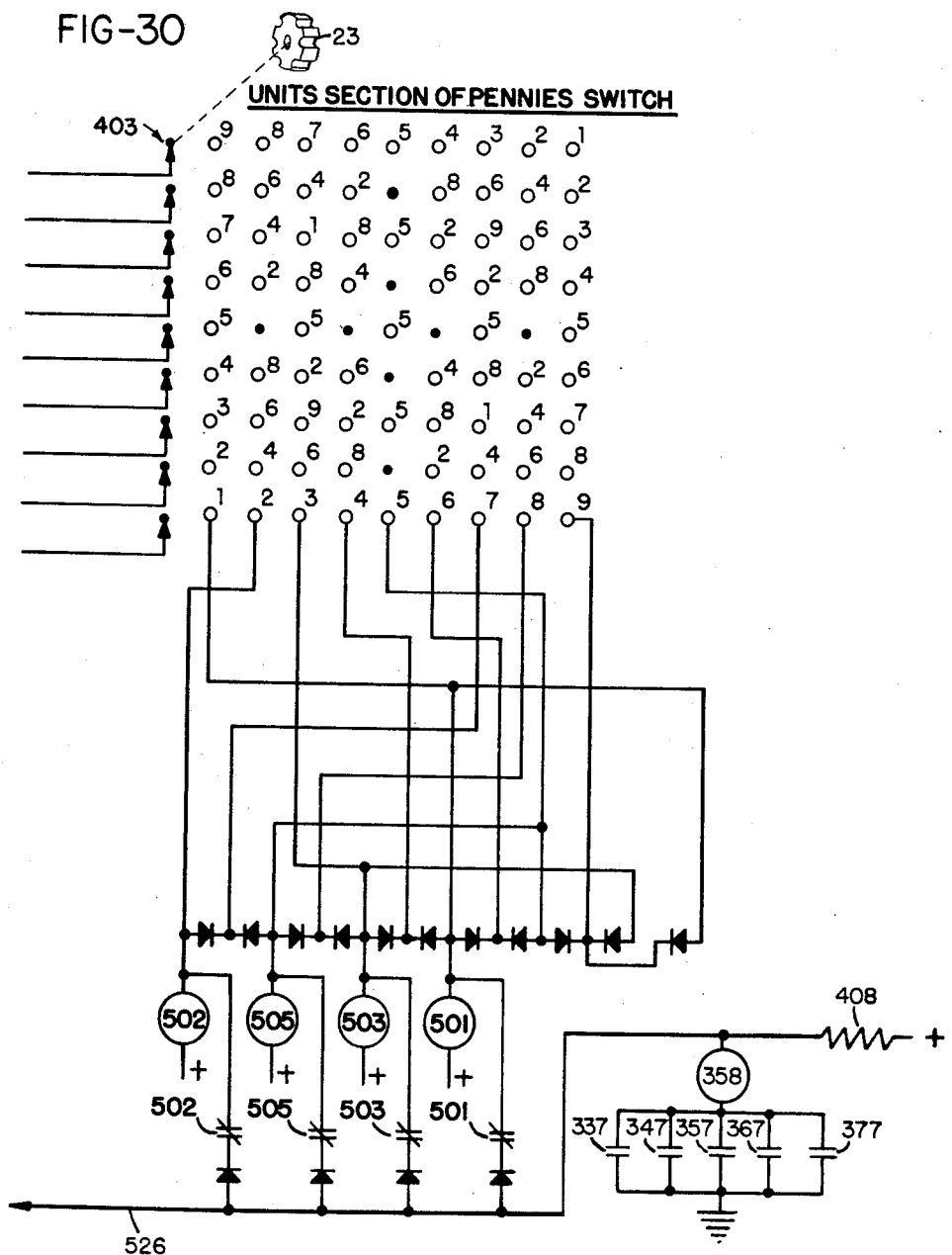
INVENTOR.
KENNETH C. ALLEN
BY
Marechal, Biebel, French & Bugg
ATTORNEYS Jan. 1, 1963    K. C. ALLEN    3,071,318
WEIGHING SCALES
Filed Aug. 5, 1960    36 Sheets-Sheet 33

INVENTOR.
KENNETH C. ALLEN
BY
Marechal, Biebel, French & Bugg
ATTORNEYS

Jan. 1, 1963  K. C. ALLEN  3,071,318
WEIGHING SCALES

Filed Aug. 5, 1960  36 Sheets-Sheet 36

TENS SECTION OF
PENNIES SWITCH

TO FIG-28

INVENTOR.
KENNETH C. ALLEN
BY
Marshall Biebel, French & Bugg
ATTORNEYS

United States Patent Office 3,071,318
Patented Jan. 1, 1963

3,071,318
WEIGHING SCALES
Kenneth C. Allen, Dayton, Ohio, assignor to The Hobart Manufacturing Company, Troy, Ohio, a corporation of Ohio
Filed Aug. 5, 1960, Ser. No. 47,713
15 Claims. (Cl. 235—58)

This invention relates to computing scales and more particularly to a computing scale system having a ticket printer and including a safeguard against the issuance of an erroneous ticket by such printer in the event that the computed value exceeds the capacity of the system.

Systems of the type to which this invention pertains are particularly useful in food stores for pre-packaging operations wherein a series of successive packages or articles of food commodities are weighed and then labeled with a printed ticket identifying the commodity together with its weight, unit price and value. Such systems are disclosed in a series of copending applications identified as Cases A to E inclusive in accordance with the index table at the end of this specification, all of which are assigned to the assignee of the present application, and further reference to these applications will be found hereinafter.

The preferred embodiments of this invention are described as improvements to the invention disclosed in Case D. The invention has particular utility in computing scale systems wherein a possibility exists of the product of weight and price resulting in the formation of a digit or digits in any column of the value in excess of a desired amount. This is usually determined by limitations in the value storage circuits or in the printer. In such instances, the scale system cannot print an accurate ticket or label for the value of the commodity.

In the scale system of Case D, such an error would occur if in the computation of the value, a partial product of weight and price resulted in the formation of a digit in a higher order column which is not printable by the printer. Such an error would also occur if, in the summation of a column of partial products, there resulted a carry to a higher order column not contained in the printer. In the system disclosed in Case D, such an error cannot occur because the limits of price and weight are such that their product will not exceed the capacity of either the printer or computer. The present invention is concerned with such systems which have higher limits of weight and/or price, and the apparatus of the invention operates in such systems upon the occurrence of circumstances which could result in a value in excess of a given capacity to prevent the issuance of a ticket and to provide an error signal.

It is therefore a principal object of this invention to provide a computing scale system as outlined above which includes an error detector to prevent the issuance of an erroneous ticket from a ticket printer for a value in excess of the capacity of the printer and/or computer.

A further object of this invention is to provide a computing scale system as outlined above having a circuit for detecting the presence of a computed value digit in a column in excess of a given capacity for preventing the printing of an erroneous ticket and preferably providing an indication of error.

Another object of this invention is to provide a computing scale system as outlined above having a circuit for detecting a partial product of the highest order of weight input and the highest order of price input resulting in an integer in a column not obtained in the printer, and a separate circuit for detecting the presence of a carry into such column, with each circuit being operable independently of the other to prevent the issuance of an erroneous ticket.

A further object of this invention is to provide a scale system which operates to prevent the printing of a ticket upon the occurrence of a digit in any column in excess of a desired amount.

Other objects and advantages of the invention will be apparent from the following description, the accompanying drawings and the appended claims.

In the drawings:

FIG. 3 is a diagram of an example of the partial product multiplication problem solved by the scale system;

FIG. 5 is a portion of the circuit of FIGS. 6–34, showing one form of the invention;

Figure 1:
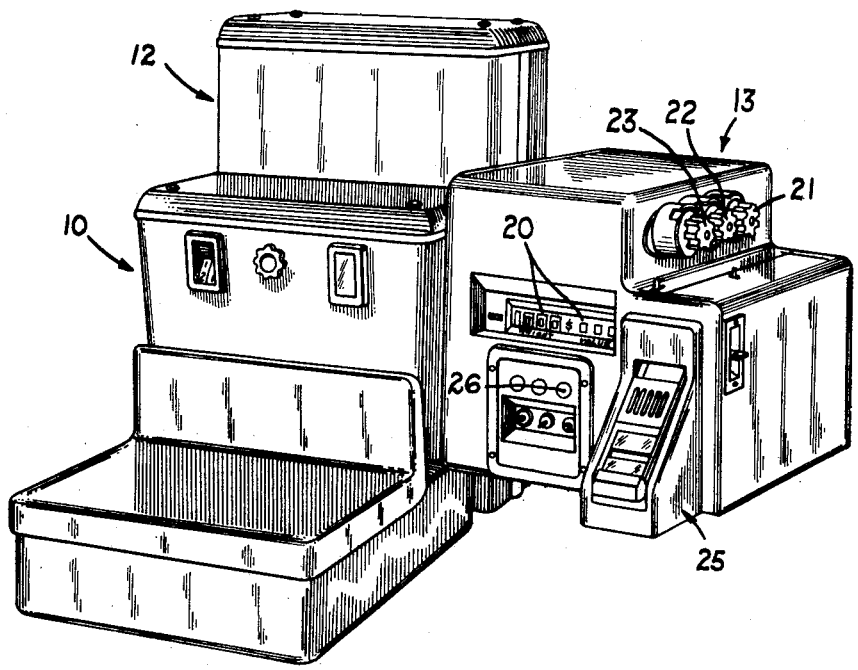
FIG. 1 is a perspective view showing a power operated scale system in accordance with this invention.
Figure 35:
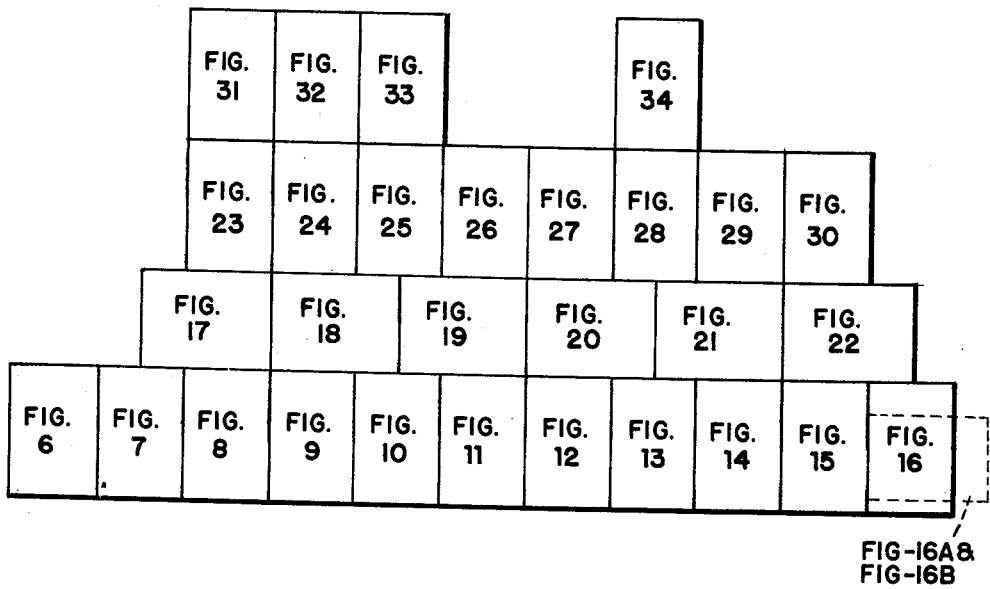
Figure 4:
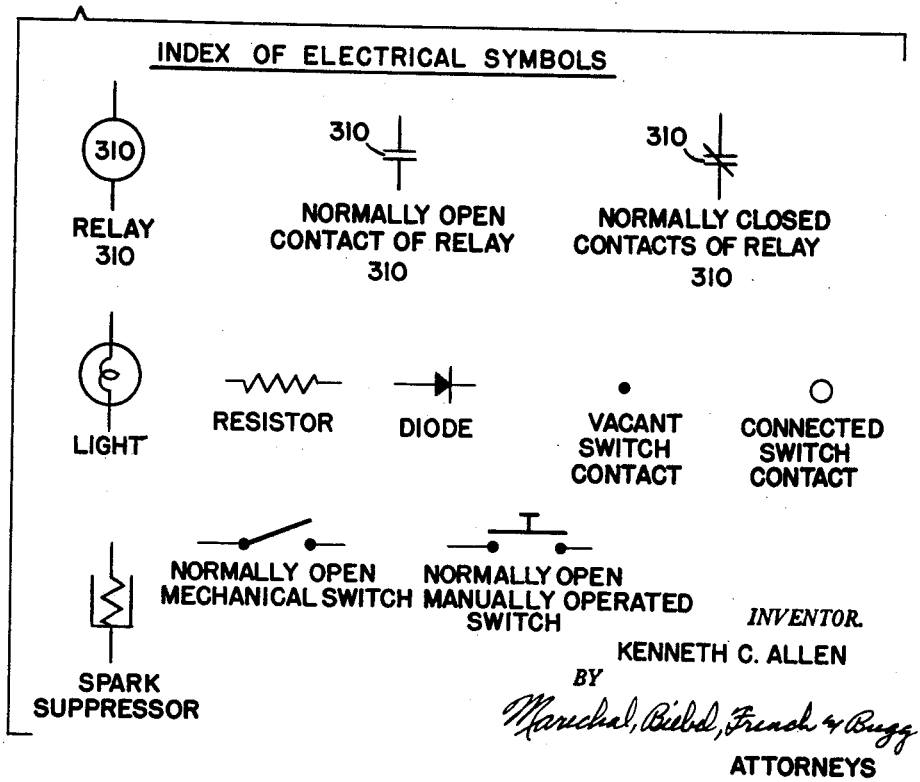
FIG. 4 is a table of electrical symbols employed herein.

FIGS. 6–34 constitute portions of a total wiring diagram for the computing scale of FIG. 1 which form a complete wiring diagram when arranged in accordance with the pattern shown in FIG. 35;

FIGS. 6A, 17A, 30A and 31A are modifications of portions respectively of FIGS. 6, 17, 30 and 31 in accordance with a further embodiment of the invention;

FIG. 16A is a modification of FIG. 16 to be taken with the figures similarly designated by "A," and which substitutes in the chart of FIG. 35 in place of FIG. 16; and FIG. 16B is a further modified form of the invention for substitution in the wiring diagram in place of FIG. 16.

Referring to the drawings, which illustrate preferred embodiments of the invention, the complete scale system of FIG. 1 includes a power operated scale indicated generally at 10 and including a platter 11 which receives the package or other article to be weighed. The weighing scale 10 may be of the type disclosed in Case D and in greater detail in Case A. Where parts in the present application and Case D correspond, the same reference characters have been used in the present drawings.

The weighing operation of the scale 10 results in the positioning of a driven wiper contact 180 (FIG. 11) for the hundredths of pound units, and the positioning of the leading and lagging pairs of wipers 201, 202; 211, 212; 221, 222 (FIG. 12) respectively for the tenths of pounds, pounds and tens of pounds of the article or package placed on the platform.

The positioning of the moving contacts of the weight read-out switches as designated above effects the selective energization of a plurality of weight storage relays in a computer indicated by the reference numeral 12 in FIG. 1. The storage relays consist of the relay group 310–315 for the storage of the hundredths of pounds portion of the total weight, the relay group 320–325 for the storage of the tenths of pounds, the group 330–335 for the storage of the pounds, and the group 340–342 for the storage of the tens of pounds.

It will be understood that the third numerical designation of the storage relays as specified above signifies the value of such relay in relation to the unit which is stored thereby. For example, the energization of relay 313 represents the storage of three hundredths of a pound. Stored weight units in excess of four are represented by the energization of one of the "5" relays 315, 325, 335, etc., and an additional relay, so that the storage of seven pounds would be indicated by the energization of relay 335 and relay 332.

The operating coils of the above groups of weight storage relays are shown in FIGS. 11, 12 and 13, and a portion of their associated storage contacts, representing the individual digital values of the weight, are grouped in a storage matrix of contacts shown in FIGS. 8–10. It will be noted that only three tens of pounds relays 340–342 are provided, representing 0–2 in the tens of pounds column, since the weighing capacity of the scale used in describing this preferred embodiment of the invention is twenty-five pounds. The relays 316, 326, 336 and 346 of FIGS. 11–13 are guard relays which operate sequentially to apply power to their respective families of weight storage relays until the entire weight is stored by these relays.

Figure 2:
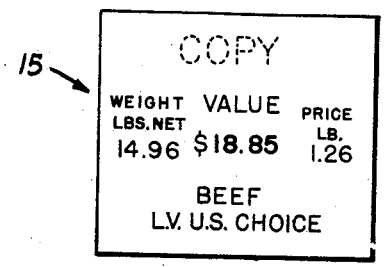
FIG. 2 illustrates a printed ticket of the type issued by the system of FIG. 1.

The scale 10 and computer 12 are, in turn, connected with a register-printer 13, often called a labeler. The printer 13 operates in the cycle of operation of the scale and computer to print and issue a printed ticket of the weight, unit price and value. An example of such printed ticket is shown at 15 in FIG. 2 which may be constructed as shown in detail in Case B. The electrical portion of the printer material to an understanding of this invention is shown in FIG. 6 of the wiring diagram.

Figure 32:
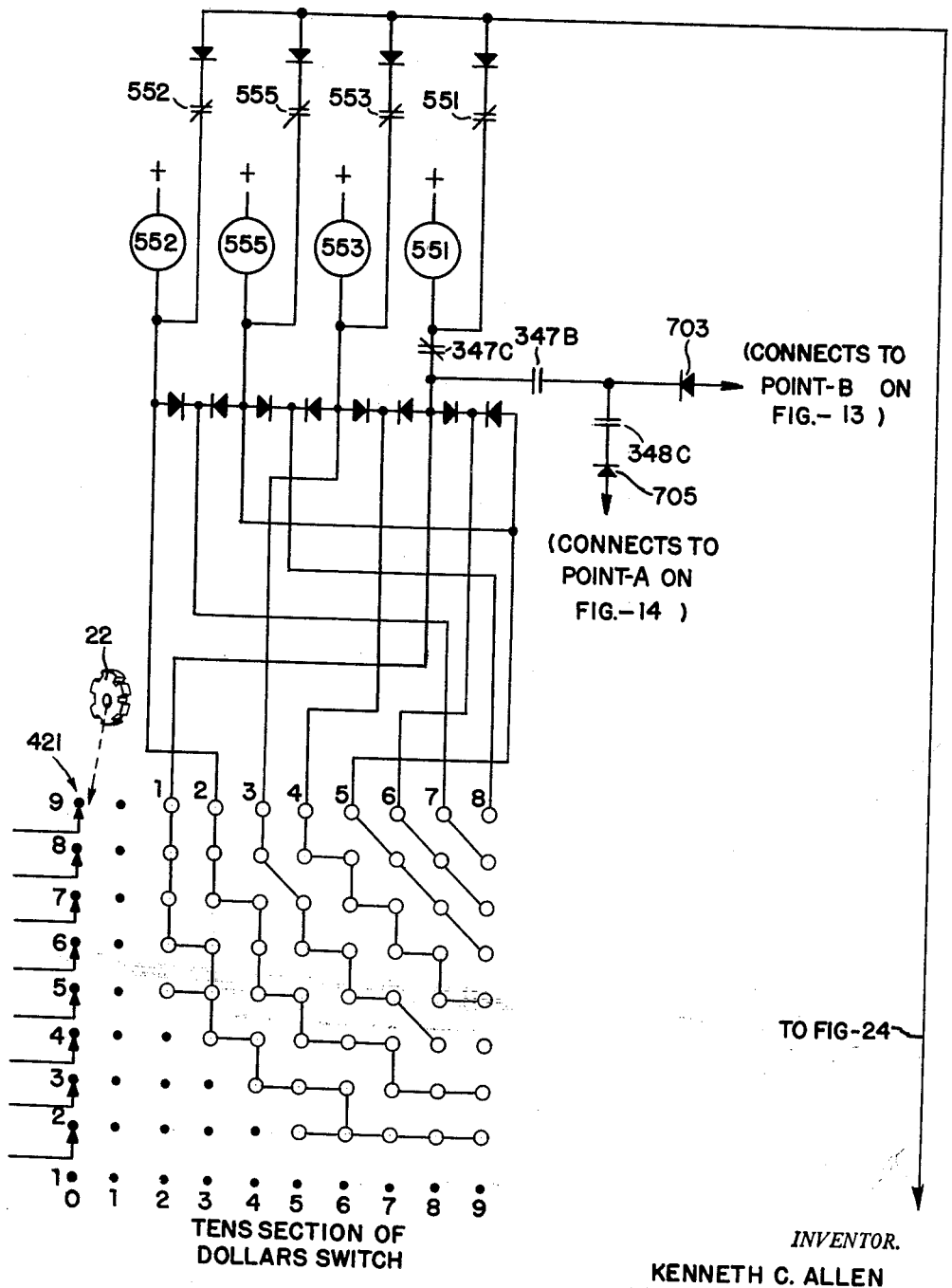
Figure 33:
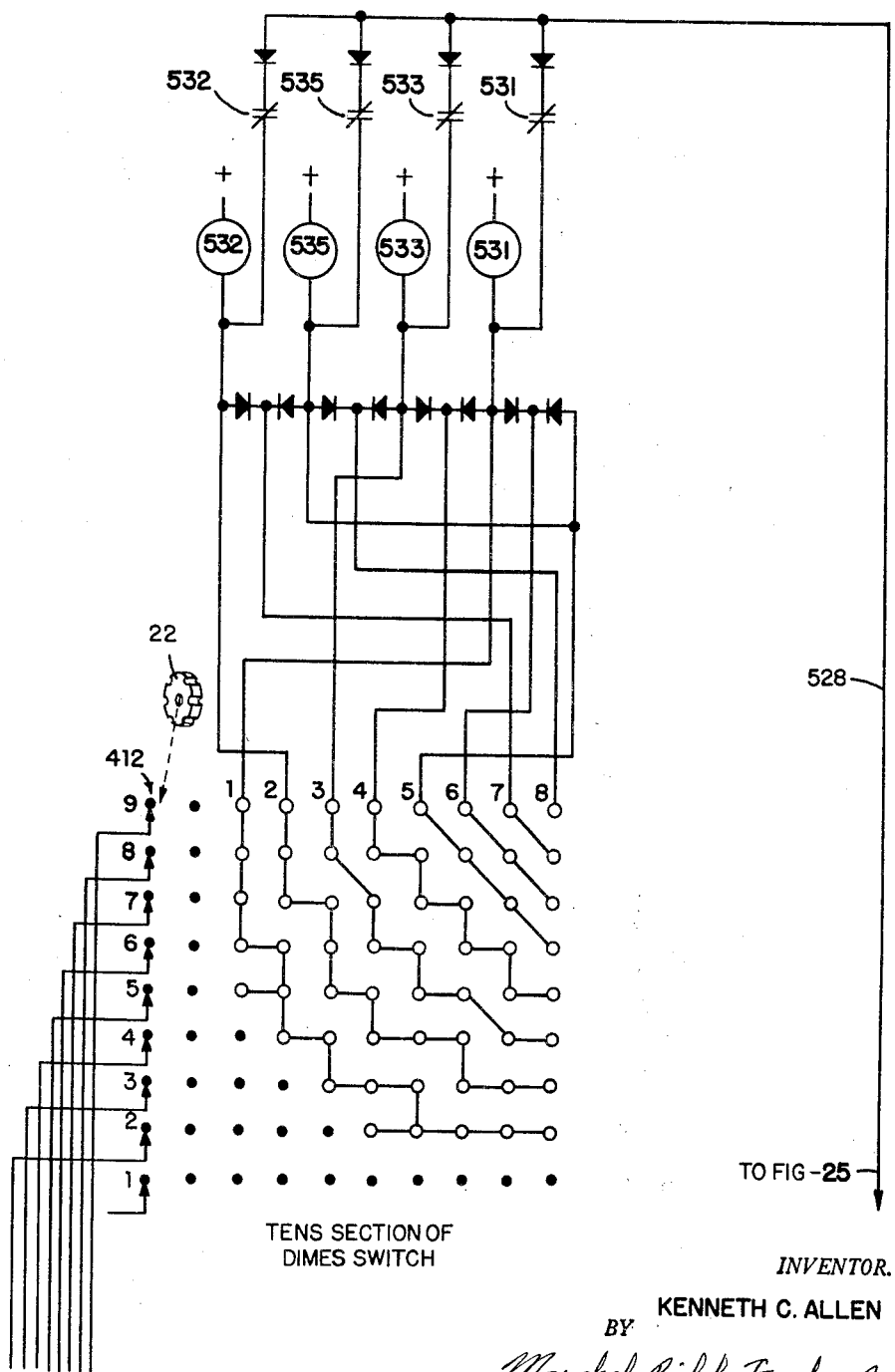
Figure 34:
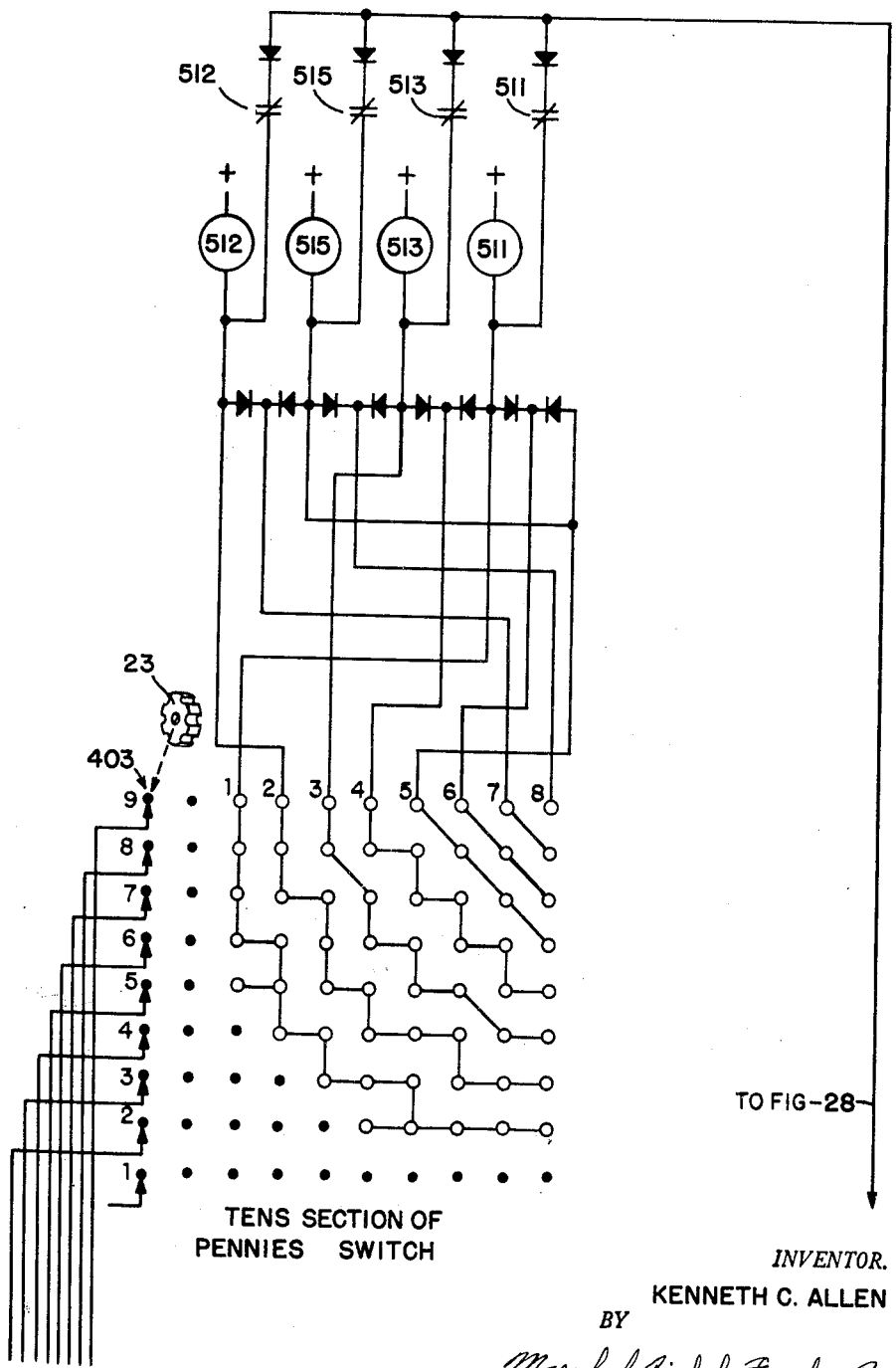

The printer 13 is provided with manual control knobs 21, 22 and 23 which consist of the price input knobs by means of which the commodity price in dollars, dimes and pennies per pound may be set into the scale system. The three price input knobs operate ganged moving contacts of three precomputed multiplying switches forming a part of the computing system. The dollars switch is shown in FIGS. 25 and 32, the dimes switch is shown in FIGS. 28 and 33, and the pennies switch is shown in FIGS. 30 and 34 and respectively include ganged wiper contacts 421, 412 and 403. The wipers are each movable by the associated knobs 21–23 according to the selected price, and are each movable into one of ten stations 0–9 corresponding to their portion of the desired price. The precomputed multiplying switches may be arranged and constructed as shown in detail in Case E.

As shown in FIG. 1, the printer 13 is also provided with visual indicator wheels 20 showing the weight and computed value of each load on the scale as set up by the type wheels 626 of FIG. 6. In addition, the printer is shown as incorporating a mechanism indicated generally at 25 which functions to receive each successive ticket issued by the printer and to deliver such ticket to the operator. Such a ticket handling mechanism is disclosed in Case C. An error light window 26 is illuminated by the lamp 250 of FIG. 7 in accordance with the present invention upon the occurrence of a weight and price input combination resulting in a computed value in excess of a given capacity.

A general understanding of the computing operation of the scale system may be had by reference to the diagrammed problem shown in FIG. 3. The computer multiplies by the system of partial products which system differs from ordinary multiplication in that all of the products are written down rather than some being mentally carried to the next step. The example uses letters instead of numbers, with the letters W, X, Y and Z representing weight in the tens, units, tenths and hundredths of pounds (or kilograms or any other convenient decimal system). The letters may be considered to be the equivalent of any number 0–9 except for "W" which, in the case of a twenty-five pound scale, cannot be greater than "2." The letters P, Q and R represent the settings for the precomputed multiplying switches in dollars, dimes and pennies (or other suitable decimal system) and may represent any three digit number.

The individual partial products are arranged below the multiplier and multiplicand in rows for summation according to columns of common powers. The computer selects one column and then effects the formation of the partial products in such column and the simultaneous summation of the selected column. The computer then moves to the next higher order column and repeats this operation. The letters ST.UV represents the computed value of the package being weighed to the nearest half-cent.

It can be seen from an examination of FIG. 3 that the columns exhibit certain characteristics in common which simplify the formation and summation of the partial products. In the first place, ZRU, the units part of the product of Z and R, can be neglected since, regardless of value, it can have no effect on the answer. The mills column includes the partial products of "Z" representing hundredths of pounds combined with pennies "R" and dimes "Q," together with the units partial product of pennies and tens of pounds "YRU." An examination of the remaining columns shows that there also exists in any given column certain weight factors which are common to certain price factors and which therefore dictate the arrangement and grouping of the contacts of the weight storage relays 310–315, 320–325, 330–335 and 340–342.

At the conclusion of the storage of the pounds of weight and concurrent with the storage of the tens of pounds of weight as signaled by the opening of the control relay 336, the sequencing relay 337 (FIG. 13) is energized to effect the summation of the mills column. Relay 337 has a pair of normally open contacts which close to apply a ground to the Y digit of weight (FIG. 29). This ground is routed through the units section of the pennies switch which, in turn, delivers back to the computer a signal representing "YRU," the units portion of this multiplication. This number is represented by the energization, through the closed contacts 337, of one or more of the adding relays 501, 502, 503 or 505 (FIG. 30) connected for energization at the output of the units section of the pennies switch. If the value stored in the tenths of pounds group of storage relays is zero (320 energized), or if the gauged selector switch 403 is set in the zero position, then YRU would equal zero and there would be no operation of any of the units of pennies adding relays.

The summation effected by all of the adding relays is based upon the quinary system of fives according to the following schedule using the mills adding relays as an example:

1=501
2=502
3=503
4=503+501
5=505
6=505+501
7=505+502
8=505+503
9=505+503+501

Therefore, the closing of the relay 337 in the mills column effects the energization of the units of pennies adding relays according to the above schedule. Also, since ZRT and ZQU must be added to this column, there is a relay contact 337 in the one hundredths pound input to the tens section of the pennies switch and the units section of the dimes switch which respectively effect the energization of the tens of pennies adding relays 511, 512, 513 and 515 and the units of the dimes adding relays 521, 522, 523 and 525.

The purpose in adding the mills column is to determine whether the summation is less than five or five or more, for the purpose of applying a carry to the pennies column if the summation of the mills column is five or greater. Accordingly, no mills value storage relays are provided, but the column is added through the adding rings of FIGS. 17, 18 and 19 for the purpose of determining whether or not a carry should be applied to the subsequent column.

Figure 17:
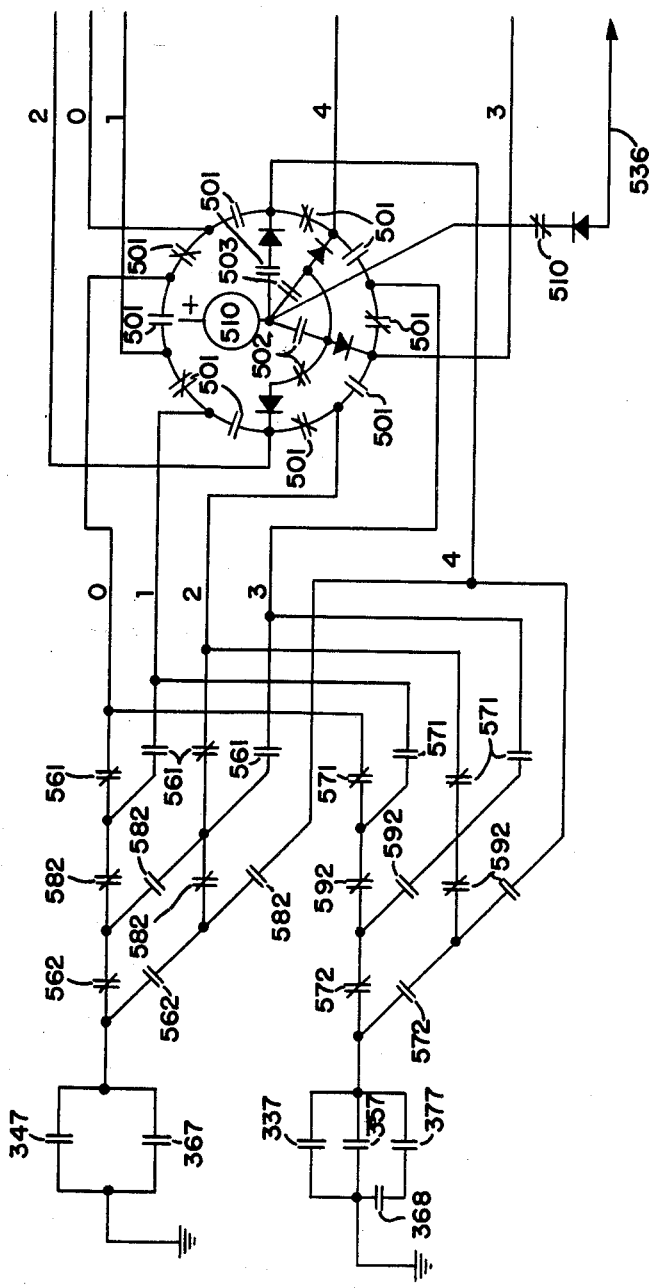
Figure 18:
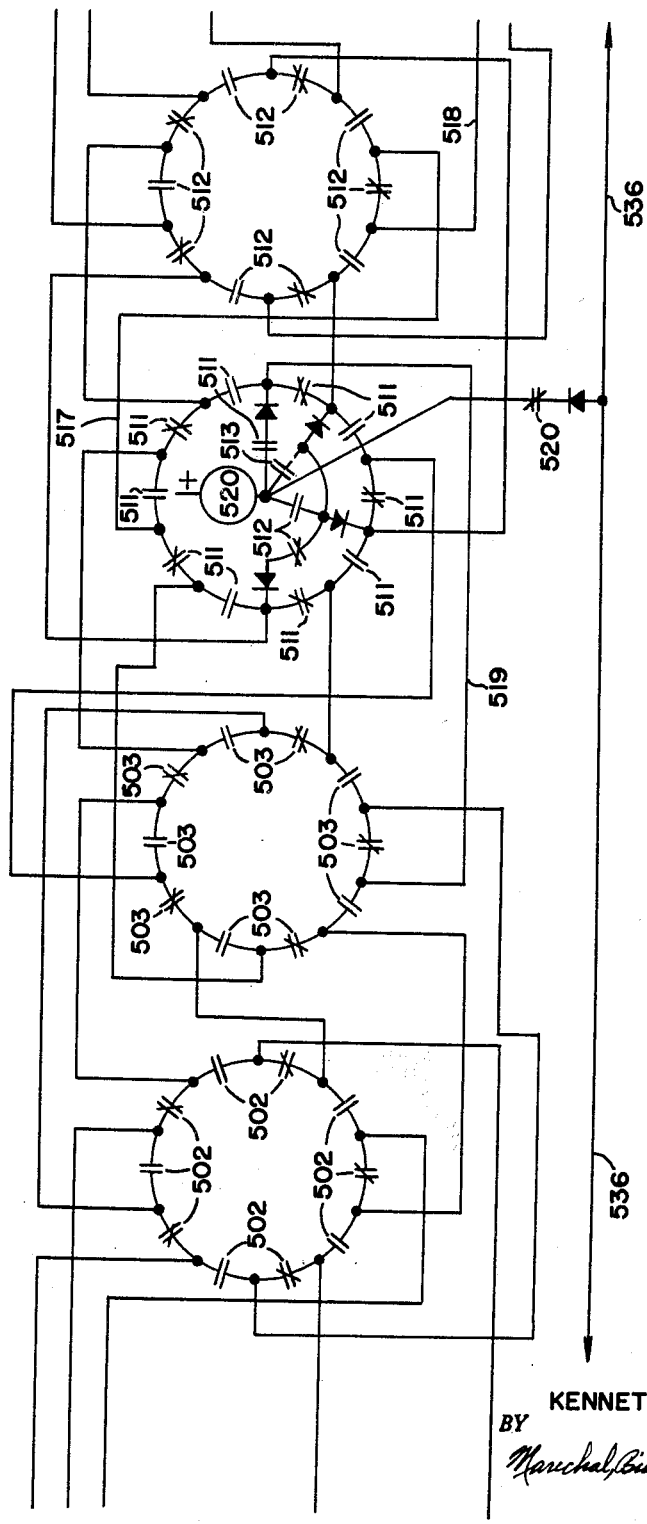
Figure 19:
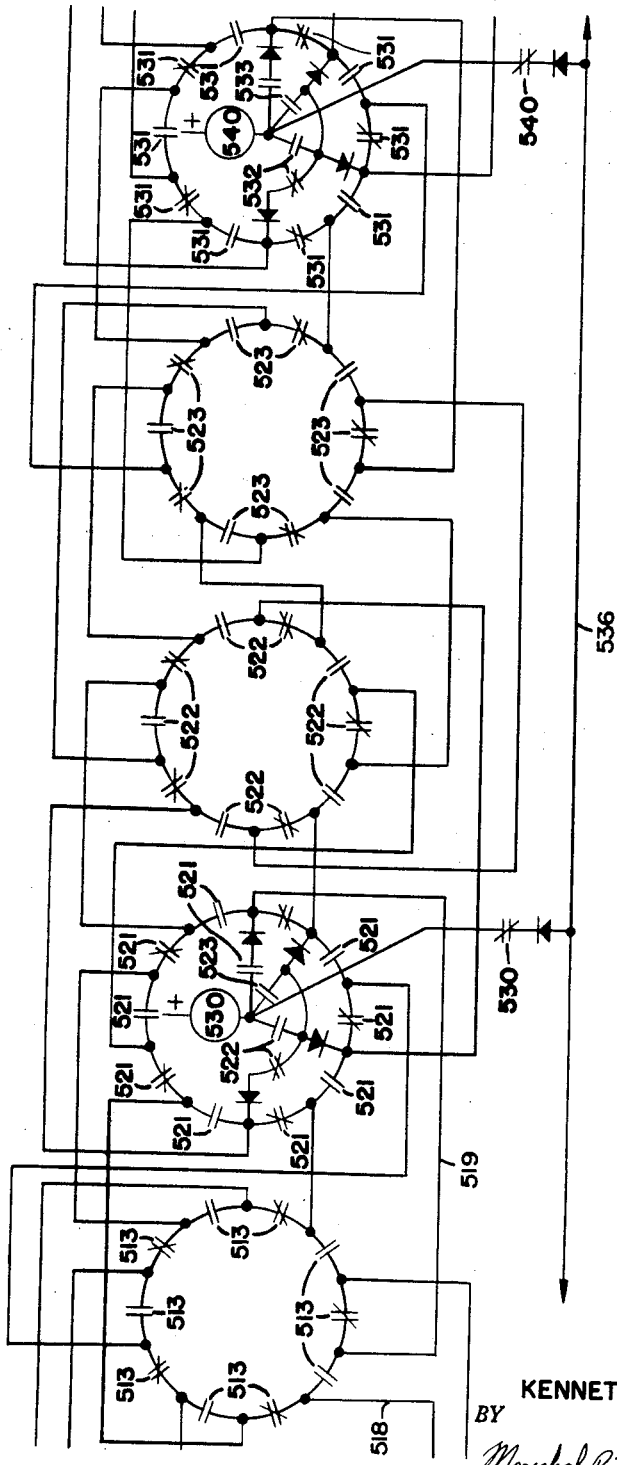
Figure 23:
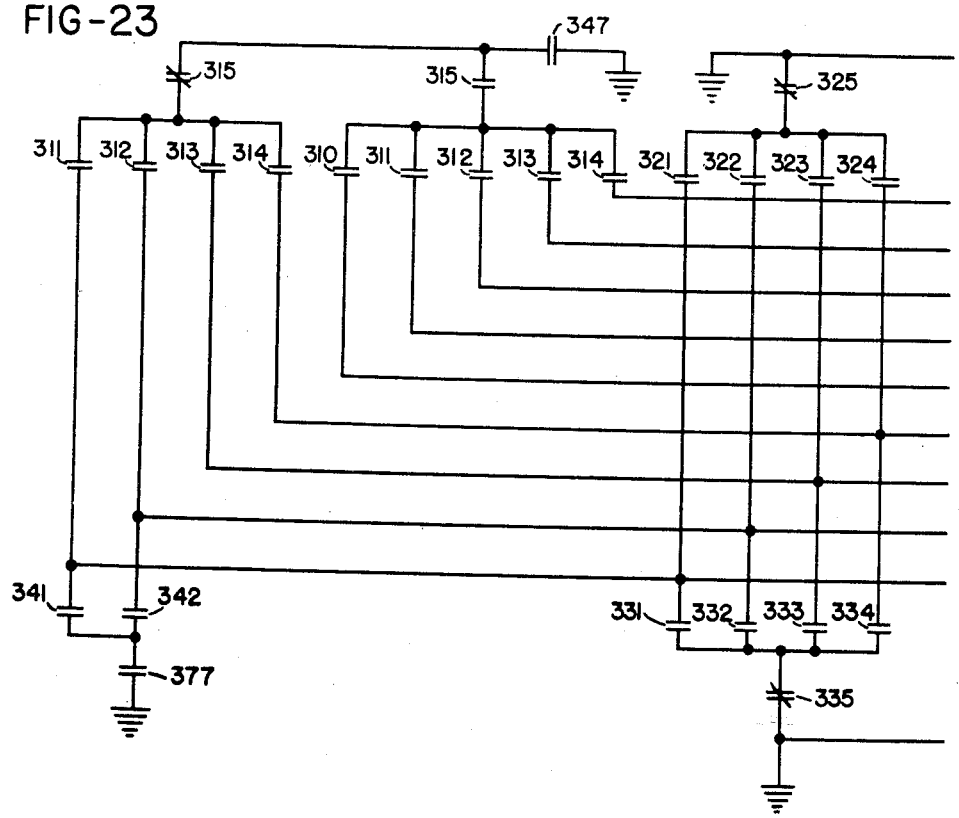
Figure 31:
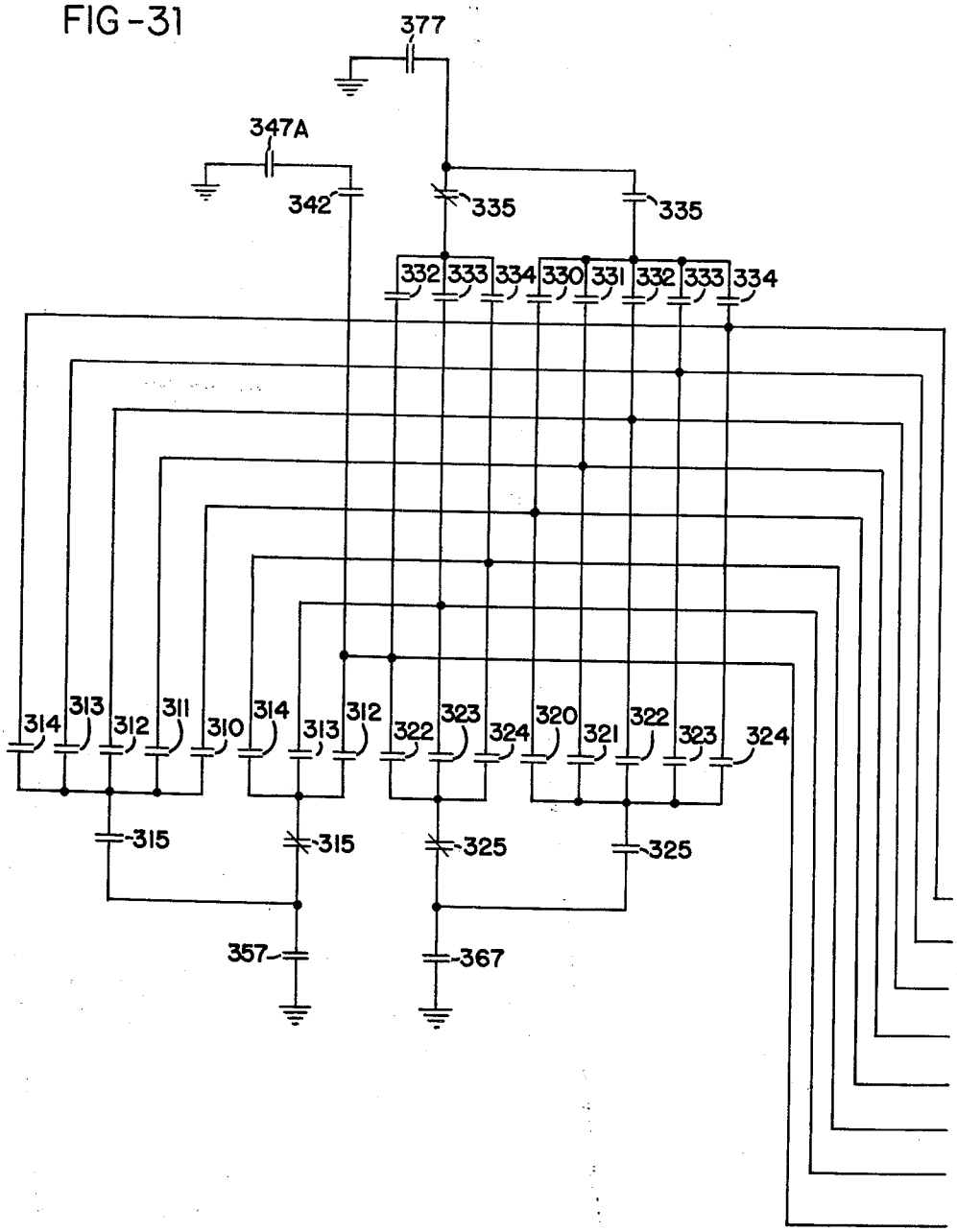

It will be noted that the contacts of the units of pennies relays 501, 502 and 503 are arranged in three interconnected rings of FIG. 17 and a portion of FIG. 18, called adding rings. Similarly, the contacts of each of the remaining group of adding relays are arranged in similar groups of three adding rings as shown in FIGS. 18–21 which have interconnecting leads representing 0–4.

When the sequencing relay 337 for the mills column is energized, it applies a ground on the "0" input to the first adding ring consisting of the contacts of the adding relay 501. The remaining sequencing relays 347, 357, 367 and 377 are also arranged to apply a ground to the adding rings through the adding ring input circuit of FIG. 17 for each subsequent column of addition. Since there is no carry in the addition of the mills column, the ground is applied to the zero input of the adding rings. If there had been a carry, the ground would have been applied to the appropriate one of the inputs 1–4 representing the amount of the carry.

The contacts of the adding relays in the adding rings are arranged to advance the output from the ring according to the value represented thereby. Thus, if a minus or ground enters the zero line of the ring of relay 501, and if relay 501 is unenergized, it leaves on the zero line. However, if relay 501 has been energized as by the closing of relay 337 and one of the tenth of pound contacts through the units section of the pennies switch, the signal leaves one unit higher, or on the "1" line. Similarly a ground applied to the three input line (a carry) would leave on the three line of the ring 501 if unergized, but would leave on the four line if relay 501 were energized. A ground entering the zero input of the ring composed of the 502 contacts would leave as a two if relay 502 were energized.

The adding rings are thus, in effect, an adding machine where, instead of spinning the dials, an input ground signal is shifted in number. This adding machine has only five positions instead of the usual ten, and therefore counts by fives. The rings of adding relay contacts operate to accumulate fives and operate one of the "carry 5" relays 510, 520, 530, 540, 550 or 560.

The contacts of the "carry 5" relays form a matrix together with the contacts of the "add 5" adding relays 505, 515, 525, 535, 545 and 555, as shown in FIG. 22. The matrix of FIG. 22 is effective in energizing the carry relays 571, 561, 572, 562, 592 and 582 whose contacts in turn are effective at the initiation of a subsequent column to apply even numbers of fives as 1, 2, 3 or 4 as stored in the matrix to the carry inputs of FIG. 17.

Referring back to the summation of the mills column, the purpose of such summation was to form a "1" carry if the sum is five or more. Therefore, relay 337 has a contact arranged to energize the "add 5" relay 345 in FIG. 25, for arbitrarily adding a five digit during the summation of this column. In this manner, a carry of one may be created for entry into the following summation of the pennies column if the sum of the mills column were five or more.

The carries to the subsequent columns are entered by the energization of one or more of the carry relays 561, 571, 562, 572, 582, 592 as determined by the carry control relays 338 and 339, all shown in FIG. 22. These carries are designated "even" and "odd" according to the column into which they are applied as indicated in the carries row of the diagram of FIG. 3.

The formation of the partial products and the summation of the pennies column is initiated by the control or sequencing relay 347 only after the conclusion of the adding operation in the mills column and the conclusion of the concurrent storage of the tens of pounds of weight indicated by the release of relay 337, and the deenergization of the mills and tens of pounds storage guard relay 346. An examination of the groups of weight storage contacts will reveal the fact that a relay contact 347 appears in each such group associated with the precomputed multiplying switches and corresponding to X, Y and Z weight factors in the pennies column. The relay contacts 347 operate similarly to the previously described contacts of the relay 337 to apply a ground to effect the formation of the partial products of this column and their simultaneous addition in the adding rings of the respective adding relays.

The previously formed carry, if such were formed, is entered into this summation by the contacts of the even carry relay contacts of FIG. 17. The digit resulting from the summation of the pennies column is applied to the value storage relays 350–355.

The pennies storage relays 350–355 have contacts arranged in a matrix of ten contacts in FIG. 10 consisting of 350–354 representing 1–4 connected to a back or normally closed contact of relay 355, and contacts 350–354 connected to a front contact of 355 representing 5 plus 1–4. In this manner, the penny value of 0–9 is stored in the relay matrix of FIGS. 8–10.

If the summation included an odd five, this was applied from the matrix of even and odd five carry contacts of FIG. 22 through the lead 395 directly to relay 355. The even numbers of fives which may have resulted in the summation of this column are stored for subsequent application as a carry in the addition of the dimes column.

The guard relay 356 for the pennies column deenergized at the conclusion of the addition of this column and in doing so energizes relay 357 for the summation of the dimes column. This sequence continues through relays 367 and 377 for the dollars and tens of dollars columns until the summation is completed through the storage relays 350–355, 360–365, 370–375 and 380–385.

Means in the printer 13 for reading out the stored value and weight in the matrix of FIGS. 8–10 includes a motor driven read-out switch 620 in FIG. 7. The printer 13 is operated through a cycle of operation to set the type wheels 626 by a printer motor 625 operated by a motor relay 610. The motor relay is controlled by the closing of a print start relay 612.

The computer includes a start and reset relay 308 (FIG. 6) which is energized as soon as the scale 10 comes to balance. The two functions of the relay 308 are to erase all of the information stored from the previous computing cycle and to start another computing cycle. When the scale comes to balance a minus is delivered to relay 308 and since the other side of the relay is connected to a positive voltage, the relay energizes. When it energizes, its normally closed or back contacts in lead 317 (FIG. 11) open to remove voltage from the weight and value storage relays connected to the lead 317. When the line 317 is deenergized in this manner, the weight storage group of relays 310–315 will drop out, thereby energizing the first of the guard relays 316 and initiating the subsequent cycle of computation. Relay 308 then drops out. Relay 316 also operates to energize the print relay 309 which then holds in its energized position through its own front contacts until released during the printing cycle.

Prior to drop-out, relay 308 applies power to an error relay 348 in FIG. 13, which is then held closed throughout the cycle of operation by its own contacts, unless in the meantime, an error occurs which has the effect of shunting down the relay 348 or the removal of the ground to the relay 348. Several of such error causing circumstances are described in detail in the copending Case D, and the circumstances in which this invention operates to shunt down the error relay 348 are described in greater detail hereinafter.

In order to start a cycle of the printer to read out the storage matrix and set up the type wheels 626, relay 348 must remain energized as it includes a front contact in series with the print control relay 612. A "printer start" signal, indicating the completion of the computing operation, is applied to the printer start relay 612 by the release of the guard relay 386 signaling the conclusion of the computing cycle and the storage of the value in the storage matrix of contacts of FIGS. 8–10. This start signal is applied through the closed contacts of the relays 348 and 309. If relay 348 should be opened as upon the occurrence of an error, the printer start signal is blocked and the printer is disabled. Also, an error light 250 is illuminated through the back or release contacts of relay 348.

The preceding description therefore furnishes a background for the complete understanding of the error detecting circuits of this invention. The essential portions of the electrical circuits connected with the detection of a first embodiment are taken from the wiring diagram of FIGS. 6–34 and shown in FIG. 5. This embodiment is directed to the detection of a digit in a higher order column in excess of the capacity of the computer to store such value and/or the printer to print a ticket of such value.

FIG. 3 illustrates the two conditions which may occur to create a value with a digit in a column in excess of the capacity of the system. For the purpose of illustration, it may be assumed that the printer has type wheels corresponding to the values of ST.UV, or a maximum of $99.99. The occurrence of any partial product (WPT) in the one hundred dollar column signifies an error. Also, the occurrence of a carry into such column signifies an error. Either of these errors may result from combinations of unit price per pound and weight where a twenty-five pound scale is used with a computer adapted to accept input prices up to $9.99 per pound.

Means for detecting a carry occurring in the summation of the tens of dollars column will first be described. As described above, the error relay 348 is energized by relay 308, and remains energized through one of its front contacts designated 348a in FIG. 5. As previously explained, relay 377 is the sequencing relay for the tens of dollars storage relays 380–385. It operates through a front contact of the guard relay 386 and the latter is closed only when all of the storage relays 380–385 are released.

If a carry should be created in the formation and summation of the partial products in the tens of dollars column, this would appear as a ground at one of the points M, N or O which respectively connect to the pairs of carry relays 571–561, 592–582 and 572–562. It will be noted in FIG. 5 that relay 348 is connected to the points M, N and O through an isolation diode 700 and a pair of front contacts of the sequencing relay 377 designated as 377a. Therefore, if a carry should occur in the summation of the tens of dollars column, the positive side of the relay 348 will be shunted to ground. Resistor 641 protects the grounded circuit against overload.

The shunting of relay 348 causes it to drop out thus providing the means for preventing the printing of an erroneous ticket and for providing a visual indication of error by blocking the enabling or "print" signal at relay 612 and by illuminating the error light 250.

It is necessary to maintain the ground through the carry relay leads M, N and O by means of contact 377a for a length of time sufficient to effect the shunting down of the relay 348. This is due to the fact that the shunting of a relay to cause it to open or release is a slower process than the breaking of the power supply to the relay coil. Therefore, guard relay 386 is held energized through such ground by means of a set of contacts 348b of the relay 348 and an isolation diode 701 and prevents the opening of relays 377 and 386 until relay 348 has been opened to effect the detection of error.

Therefore, the circuit including contacts 377a and the connection to the carry relays with the error relay 348 consist of means for detecting a carry in the summation of the column representing the highest order of ten. The circuit including relay 348 and its associated contacts in series with the print control relay 612 in FIG. 6 consist of means operated by the detecting means for blocking the enabling signal to prevent the operation of the printer and the issuance of an erroneous ticket.

Means for detecting the occurrence of a partial product of the highest order of weight (tens of pounds) times the highest order of price (tens of dollars) resulting in a partial product greater than nine includes the formation of a "signal" which has as its only purpose the detection of a condition of weight and preselected price which results in a partial product in the hundreds of dollars column. A search is effected by this signal earlier in the computation than the detection of the carry as described above, and specifically during the formation and summation of the pennies column by the relays 347 and 356.

Referring again to the diagram of FIG. 3, it will be seen that a blank space exists at the bottom of the pennies column. This space is utilized to effect a ground signal which searches for the simultaneous occurrence of (1) the closure of the twenty pound storage relay 342 and (2) a setting of the dollars switch at $5 or higher. Such would necessarily result in the formation of a partial product in a column in excess of the capacity of a four column printer resulting in an error.

This is accomplished by the special provision of a pair of normally open contacts of the twenty pound storage relay 342 in the matrix of weight storage contacts operating through the tens section of the dollars switch. This contact is grounded by the sequencing relay contact 347a during the summation of the pennies column. It will be seen from the fragment of the tens section of the dollars switch shown in FIG. 5 that if the selector 421 has been seat at the "5" station or higher (it is shown in the zero position), a connection is effected through to the tens output representing a partial tens output of one. Such ground connection is applied to shunt down the relay 348 through an isolation diode 703 and the relay contact 347b to prevent the issuance of an erroneous ticket in the manner previously described.

The guard relay 356 for the pennies column is connected to the searching circuit through a diode 705 and an error relay contact 348c for the purpose of assuring the drop-out of the relay 348 prior to the removal of the ground by the sequencing relay 347 by providing a second ground path for the guard relay 356.

During this error searching process, it is desirable to prevent the energization of the tens of dollars adding relay 551, so an isolating back contact 347c is placed between it and the switch output, which contact is normally closed but which opens during the summation of the pennies column.

A further embodiment of the invention is represented by the figures designated by an "A" taken with the remaining figures making up the computer wiring diagram 6–34. In the preceding embodiment, the detection of error consists of the specific detection of a carry and/or the detection of a partial product falling in a column which was defined as being in excess of the capacity of the printer and/or computer. In the present embodiment, all the columns are added, and detection is made of the occurrence of any digit in any column of the value in excess of a desired number of columns such as may also be defined by the capacity of the printer or computer. In the example of FIG. 3, this error would be represented by a digit being formed at the column in the value row where the "$" appears.

The error detection is accomplished in this embodiment by performing a further step of addition to form the total for the hundreds of dollars column, and using the formation of any digit in the total to indicate an error by shunting down the error relay 348. The several sets of wiring diagram designated by the letter "A" represent changes to the basic drawings associated with this embodiment, and consists of changes required to form a partial product in the hundreds of dollars column, apply a carry to the addition of such column, add such column in the adder rings, and determine whether an integer exists which will be used to shunt the error relay 348. The embodiment also employs all of the remaining circuits of FIGS. 6–34 with the exception of the following:

FIG. 15—Diodes 700, 701, relay contacts 377a, 348b
FIG. 22—The leads from FIG. 15 connecting to points M, N and O
FIG. 32—Relay contacts 347b, 348c, diodes 703 and 705

The principles of operation of the addition of the hundreds of dollars column are based upon those previously discussed in connection with the formation of the partial products and summation of the preceding columns. The result, however, is not stored as it has no practical value in the present scale system other than the indication of error.

A hundreds of dollars guard relay 396, added for the purpose of this embodiment, is initially operated through a set of normally closed contacts 348d of the guard relay 348 and relay 308 and is held closed through its own contacts 396A. Means for adding a column in excess of the capacity of the printer 13 includes a contact 387b of the relay 387 in series with the tens of pounds storage relay contact 342 in FIG. 31A. The contact 387b is closed during the addition of the tens of dollars column to form the partial product WPT in the normal sequence of computer operation. Also, contacts 387c of the sequencing relay are incorporated into the input to the adding rings to apply a ground to this column of addition through the contacts of the carry relays and through the front contacts of the repeating guard relay 368.

If the summation effected through the adder rings includes any partial product, or carry, from the previous column, this results in the formation of a digit, and will appear as a ground on the "1" or "2" lines at the relay contacts 387c or 387d. This ground is applied through one of the isolation diodes 750 or 751 to point B of FIG. 13 to shunt down the error relay 348. This also opens the guard relay 396 by reason of the opening of the contacts 348d. The connection of point B to the "1" and "2" lines through the diodes 750 and 751 forms the means for detecting the presence of a digit in a column in excess of the capacity of the computing system to store a digit in such column and/or the printer to record a digit in such column.

Figure 6A:
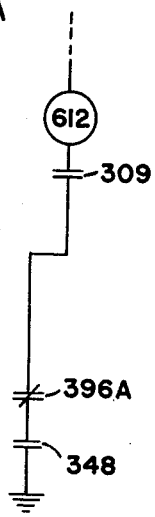
Figure 17A:
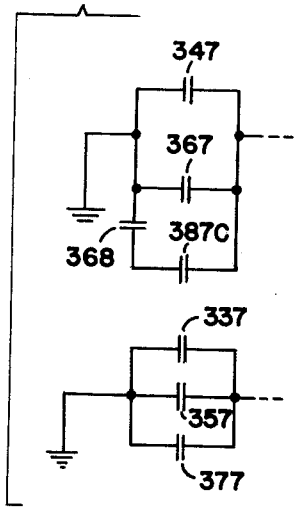

If, however, a ground appears on the "0" line, this indicates that no digit has been formed by the summation of the hundreds of dollars column, and the guard relay 396 is released by shunting through the closed contacts 387a. Referring to FIG. 6A taken with FIG. 6 it will be seen that the release of the guard relay 396 applies a printer start signal by energizing the printer control relay 612 through the closed contact of the error relay 348, the back contacts 396a, and the print relay 309, and a ticket of the computed value is printed in the normal manner.

Figure 30A:
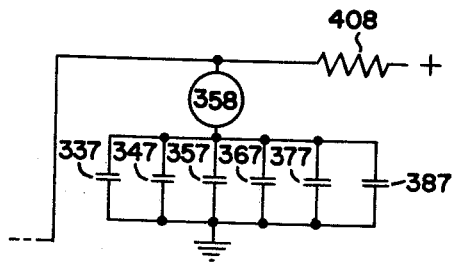
Figure 31A:
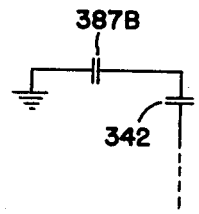

As shown in FIG. 30A, the inclusion of the additional sequencing relay 387 necessitates the inclusion of a normally open contact of this relay in the grounding circuit for the interlocking relay 358. The purpose of this relay is to assure that all of the adding relays for each column of addition have been energized before the computing cycle is permited to continue.

The preceding embodiments are directed to the detection of a digit occurring in a column in excess of the capacity of the system. However, the system capacity may not be defined solely by a fixed or given number of whole columns, but may be defined by a maximum digit within a column. For instance, the system may not have the capability of storing or printing above a given number in a particular column. For example, in certain circumstances it may be desired to print tickets to a maximum of $49.99 wherein the printer may be provided with a numerical capacity of 49.99. Also, the value storage relay 385 in FIG. 16 may be omitted from the circuit with such a printer. Since there would exist possible combinations of price and weight which can exceed $49.99, it is desirable to prevent the printing of a ticket and to provide an indication of error for values in excess of this amount. The embodiment of FIG. 16B provides the means for detecting the occurrence of a totalled value in any column of the value in excess of a desired digit, and operates to prevent the issuance of a ticket in such circumstances.

The value storage relays store the individual digits of the columns of the value in the storage matrix of FIGS. 8–10 according to the following schedule, using the tens of dollars relays as an example:

| Digit: | Relay energized |
|---|---|
| 0 | 380 |
| 1 | 381 |
| 2 | 382 |
| 3 | 383 |
| 4 | 384 |
| 5 | 385 and 380 |
| 6 | 385 and 381 |
| 7 | 385 and 382 |
| 8 | 385 and 383 |
| 9 | 385 and 384 |

The storage relays are energized through the leads designated 0–5 of FIG. 16B which are sequentially grounded through the adder rings for the digits in the columns of V, U, T and S.

For the purpose of illustrating this embodiment in FIG. 16B, a circuit is shown by means of which the issuance of a ticket is prevented by shunting down the error relay 348 upon the occurrence of a selected digit 2–9 in the tens of dollars column. The FIG. 16B is electrically identical to FIG. 16 except for the addition of circuits of this embodiment which are shown as being connected for the limitation of the tens of dollars column, although any other column may be chosen.

Selectable means for detecting the occurrence of a given digit in excess of the value handling capacity of the scale system in a given column includes a lead designated as point "C'" which is connected to point B of FIG. 13 through an isolation diode 775 and a pair of normally open contacts 348f of the guard relay 348. The grounding of point C therefore effects the shunting down of the error relay 348 and the blocking of the printer, as previously designed.

Point C is also connected to the tens of dollars guard relay 386 through a diode 776. This connection to the guard relay 386 provides a temporary parallel or sustaining ground path for this relay to assure that the computer's cycle is held at this column by the continued energization of relay 386 until the error relay 348 releases and contacts 348f open. A terminal strip 778 designated by the terminals 2–9 is connected to selected ones of the energizing or grounding leads of the tens of dollars storage relays. The numerical designation represent minimum digits in this column at which an error may be indicated by appropriate connections between the terminal strip 778 and point C.

The terminals designated as 2, 3 and 4 are connected respectively to input leads 2, 3 and 4 through isolation diodes 780. Terminal 5 is connected directly to the energizing lead for relay 385, and terminals 6–9 are connected to this lead respectively through normally open contacts of the relays 381–384. No provision is made for effecting the shunting of relay 348 upon the entry of a "1" to this column since this falls within scope of the preceding embodiments for detecting the occurrence of any digit into a column in excess of the system capacity.

Point C is connected to the terminal strip 778 in accordance with a desired capacity in the selected column as shown in the following schedule:

| Column Capacity | Connect to Point C |
| --- | --- |
| Pass 0–1, error at 2 or higher | Terminals 2, 3, 4 and 5 (Relays 382–385 may be removed). |
| Pass 0–2, error at 3 or higher | Terminals 3, 4 and 5 (Relays 383–385 may be removed). |
| Pass 0–3, error at 4 or higher | Terminals 4 and 5 (Relays 384–385 may be removed). |
| Pass 0–4, error at 5 or higher | Terminal 5 (Relay 385 may be removed). |
| Pass 0–5, error at 6 or higher | Terminals 6, 7, 8 and 9. |
| Pass 0–6, error at 7 or higher | Terminals 7, 8 and 9. |
| Pass 0–7, error at 8 or higher | Terminals 8 and 9. |
| Pass 0–8, error at 9 | Terminal 9. |

With any of the above combination of connections it will be seen that ground appearing at any lead connected to point C has the effect of shunting the error relay 348 through the contacts 348f. This ground is also applied through diode 776 to guard relay 386 to assure that this ground is maintained until the error relay drops out. It is understood that the circuit described above may be applied with equal facility to detection of digits within any other column by the appropriate connection of the leads.

It is therefore seen that the invention has applicability to any computing and printing system wherein a possibility exists of the occurrence of a digit in a column, which digit or column is in excess of the capacity of the particular system, and operates to provide an indication of error and to prevent the printing of an erroneous ticket. This invention has the advantage of permitting the input of higher unit prices and higher weights within a given value storing and printing system without the necessity of expanding the system and without the necessity of particularly checking and rejecting erroneous tickets which would otherwise be printed.

While the forms of apparatus herein described constitute preferred embodiments of the invention, it is to be understood that the invention is not limited to these precise forms of apparatus, and that changes may be made therein without departing from the scope of the invention which is defined in the appended claims.

*Table of Cases*

| Case | Inventor(s) | Serial No. | Filing Date | Patent No. |
| --- | --- | --- | --- | --- |
| A | Kenneth C. Allen | 376,136 | Aug. 24, 1953 | 2,948,523 |
| B | do | 548,148 | Nov. 21, 1955 | 2,948,465 |
| C | Kenneth C. Allen and David A. Meeker. | 561,336 | Jan. 25, 1956 | 2,948,466 |
| D | Kenneth C. Allen | 637,725 | Feb. 1, 1957 | |
| E | Kenneth C. Allen, Edwin E. Boshinski, and David A. Meeker. | 782,219 | Dec. 22, 1958 | |

What is claimed is:

1. A computing scale system comprising, a weighing scale including read-out means for providing weight information representing the weight of an article placed thereon, a computer connected to receive said weight information from said scale and having a selectable input representing price and arranged to compute the product of said weight and price for providing a value output, a ticket printer connected to receive said value output for issuing a printed ticket of the computed value, said system having a maximum value handling capacity less than the maximum possible product of said price and weight, means in said computer for detecting the occurrence of a value in excess of the capacity of said system, and means operated by said detecting means upon the detection of such an excess value for preventing the printing of an erroneous ticket.

2. A computing scale system comprising, a weighing scale provided with a weight read-out, a computer connected to receive and store a weight signal from said weight read-out and having a selectable input representing price, means in said computer for multiplying said price and weight into a total value, a printer connected to receive said value and arranged for operation upon an enabling signal from said computer to issue a printed ticket thereof, said printer having a maximum printing capacity in columns less than the capacity of said computer, means for detecting the occurrence of a digit in excess of said capacity of the printer, and means operated by said detecting means for blocking said enabling signal to prevent the operation of said printer.

3. In a computing scale system including a weighing scale, a computer and a labeler for printing a ticket of the computed value of an article weighed on such scale, the improvement comprising price input means in said computer for setting in the price of an article to be weighed on said scale, means in said computer for combining the weight of said weighed article with the price thereof into a value, means for storing said value, means in said labeler for reading out said stored value and for printing a ticket thereof upon a start signal, means for detecting the occurrence of a computed value in excess of the value handling capacity of said system, and means operated by said detecting means for preventing the printing of a ticket by the blocking of said start signal.

4. A computing scale system comprising, a weighing scale including read-out means for providing weight information representing the weight of an article placed thereon, a computer connected to receive said weight information from said scale and having a selectable input representing price and arranged to compute the product of said weight and price for providing a value output, a ticket printer connected to receive said value output for issuing a printed ticket of the computed value, said printer having a maximum printing capacity in columns less than the maximum number of possible columns of the value, means in said computer for detecting the presence of a digit in a column in excess of the capacity of the printer, and means operated by said detecting means upon the detection of such a digit for preventing the printing of an erroneous ticket.

5. A computing scale system comprising, a weighing scale including read-out means for storing weight information representing the weight of an article placed thereon, a computer connected to receive said weight information from said scale and having a selectable price input, said computer having means for computing the product of said weight and price and for storing said product in columns thereof and providing a voltage signaling the storage of said product, a ticket printer operated upon receiving said voltage and connected to read out said product for issuing a printed ticket thereof, said system having a maximum value handling capacity in columns less than the maximum possible columns of said value, means in said computer for detecting the occurrence of a digit in a column in excess of the capacity of said system, and means operated by said detecting means for blocking said signal voltage for preventing the issuance of an erroneous ticket.

6. A computing scale system comprising, a weighing scale provided with a weight read-out, a computer connected to receive and store a weight signal from said weight read-out and having a selectable input representing price, means in said computer for combining said price and weight into a plurality of columns of partial products according to their respective powers, means for adding said partial products by columns to produce a total value, a printer connected to receive said value and arranged for operation upon an enabling signal from said computer to issue a printed ticket of said value, said printer having a maximum printing capacity in columns corresponding to a given number of columns, means for detecting the occurrence of a carry in the summation of the column representing the highest order column of said printer, means for detecting a partial product in excess of nine in the column representing the highest order column of said printer, and means operated by each of said detecting means for blocking said enabling signal to prevent the issuance of a ticket by said printer.

7. A computing scale system comprising, a weighing scale provided with a weight read-out, a computer connected to reecive and store a weight signal from said weight read-out and having a selectable input representing price, means in said computer for combining said price and weight into a plurality of columns of partial products according to their common powers, means for adding said partial products sequentially by said columns to produce a total value, a printer connected to receive said value and arranged for operation upon an enabling signal from said computer to issue a printed ticket thereof, said printer having a maximum printing capacity corresponding to the highest order of said columns, means for detecting a carry in the summation of said highest order column, means independent of said preceding means for detecting a partial product of the highest order of weight times the highest order of price resulting in a partial product greater than nine, and means operated by each of said preceding means for blocking said enabling signal to prevent the operation of said printer.

8. A computing scale system comprising, a weighing scale provided with a weight read-out, a computer connected to receive a weight signal from said weight read-out and having a selectable input representing price, means in said computer for combining said price and weight into a plurality of partial products, means for adding said partial products according to their common powers to produce a total value, means for storing said value according to digits in columns of said value, a printer having means connected to read out said stored value and arranged to operate upon an enabling signal from said computer to issue a printed ticket of said value, said system having a maximum storing and printing capacity of N columns, means in said computer for detecting the occurrence of a digit in a column in excess of N, and means operated by said preceding means for blocking said enabling signal to prevent the printing of a ticket.

9. A computing scale system comprising, a weighing scale provided with a weight read-out, a computer connected to receive a weight signal from said weight read-out and having a selectable price input, means in said computer for combining said price and weight into a plurality of partial products, means for adding said partial products by columns according to their common powers to produce a total value, a printer connected to receive said value and arranged to operate upon an enabling signal from said computer to issue a printed ticket of said value, said system having a maximum value handling capacity of N columns, means in said computer for detecting the occurrence of a digit in a column in excess of N resulting from the formation of a partial product, means in said computer for detecting a carry into said excess column, and means operated by each of said detecting means for blocking said enabling signal to prevent the printing of a ticket.

10. A computing scale system comprising, a weighing scale provided with a weight read-out, a computer connected to receive and store a weight signal from said weight read-out and having a selectable input representing price, means in said computer for combining said price and weight into a plurality of columns of partial products according to their respective powers, means for adding said partial products by columns to produce a total value, a printer connected to receive said value and arranged for operation upon signal from said computer to issue a printed ticket of said value, said printer having a maximum printing capacity in columns corresponding to a given number of columns of said value, means in said computer for adding a column in excess of the capacity of the printer, and means operated upon the occurrence of an integer in said excess column to prevent the issuance of a ticket by said printer.

11. A computing scale system comprising, a weighing scale including read-out means for providing weight information representing the weight of an article placed thereon, a computer connected to receive said weight information from said scale and having a selectable input representing price and arranged to compute the product of said weight and price for providing a value output in columns, a ticket printer connected to receive said value output for issuing a printed ticket of the computed value, means in said computer for detecting the occurrence of a digit in a given column in excess of a predetermined maximum digit, and means operated by said detecting means for preventing the printing of a ticket.

12. A computing scale system comprising, a weighing scale including read-out means for providing weight information representing the weight of an article placed thereon, a computer connected to receive said weight information from said scale and having a selectable input representing price and arranged to compute the product of said weight and price for providing a value output in columns, a ticket printer connected to receive said value output for issuing a printed ticket of the computed value, said system having a given maximum digital capacity in the highest order column of said value, means in said computer for detecting the occurrence of a digit in said highest order column in excess of said system capacity, and means operated by said detecting means for preventing the printing of an erroneous ticket.

13. In a computing scale system including a weighing scale, a computer and a labeler for printing a ticket of the computed value of an article weighed on such scale, the improvement comprising price input means in said computer for setting in the price of an article to be weighed on said scale, means in said computer for combining the weight of said weighed article with the price thereof into a value, means for storing said value by decimal columns thereof, means in said labeler for reading out said stored value and for printing a ticket thereof upon a start signal, means for detecting the occurrence of a given digit in excess of the value handling capacity of said system in one of said columns, and means operated by said detecting means for preventing the printing of a ticket by the blocking of said start signal.

14. A computing scale system comprising, a weighing scale including read-out means for providing weight information representing the weight of an article placed thereon, a computer connected to receive said weight information from said scale and having a selectable input representing price and arranged to compute the product of said weight and price for providing a value output, a ticket printer connected to receive said value output for issuing a printed ticket of the computed value, said system having a maximum value handling capacity less than the maximum possible product of said price and weight, means in said computer for detecting the occurrence of a value in excess of the capacity of said system, and means operated by said detecting means upon the detection of such an excess value for preventing the printing of an erroneous ticket and for providing an externally discernable signal indicating the occurrence of an error.

15. The computing scale system of claim 2 comprising an error light operated by said last-named means providing a visual indication of the occurrence of said excess digit.

References Cited in the file of this patent

UNITED STATES PATENTS

| | | |
|---|---|---|
| 2,101,452 | Rauch | Dec. 7, 1937 |
| 2,120,373 | Rast | June 14, 1938 |
| 2,549,752 | Volk | Apr. 17, 1951 |
| 2,722,381 | Komusin | Nov. 1, 1955 |